(12) United States Patent
Mizuguchi et al.

(10) Patent No.: US 8,965,896 B2
(45) Date of Patent: Feb. 24, 2015

(54) DOCUMENT CLUSTERING SYSTEM, DOCUMENT CLUSTERING METHOD, AND RECORDING MEDIUM

(75) Inventors: Hironori Mizuguchi, Tokyo (JP); Dai Kusui, Tokyo (JP)

(73) Assignee: NEC Corporation, Tokyo (JP)

( * ) Notice: Subject to any disclaimer, the term of this patent is extended or adjusted under 35 U.S.C. 154(b) by 295 days.

(21) Appl. No.: 13/518,401

(22) PCT Filed: Dec. 21, 2010

(86) PCT No.: PCT/JP2010/073042
§ 371 (c)(1),
(2), (4) Date: Jun. 22, 2012

(87) PCT Pub. No.: WO2011/078186
PCT Pub. Date: Jun. 30, 2011

(65) Prior Publication Data
US 2012/0259855 A1 Oct. 11, 2012

(30) Foreign Application Priority Data
Dec. 22, 2009 (JP) ................................. 2009-290956

(51) Int. Cl.
*G06F 7/00* (2006.01)
*G06F 17/30* (2006.01)

(52) U.S. Cl.
CPC ................................ *G06F 17/30598* (2013.01)
USPC .......................................... 707/739; 707/738

(58) Field of Classification Search
CPC ............................................. G06F 17/30598
USPC ................................. 707/738, 739
See application file for complete search history.

(56) References Cited

U.S. PATENT DOCUMENTS

2007/0118376 A1* 5/2007 Mukerjee ...................... 704/245

FOREIGN PATENT DOCUMENTS

| JP | 11-203319 | 7/1999 |
| JP | 2008-204374 | 9/2004 |
| JP | 2005-092442 | 4/2005 |
| JP | 2006-221478 | 8/2006 |

OTHER PUBLICATIONS

Peng et al., A new similarity computing method based on concept similarity in Chinese text processing, Sci China Ser F-Inf Sci, Sep. 2008, vol. 51, No. 9, pp. 1215-1230.*

Peng et al., A Clustering Algorithm for Short Documents Based on Concept Similarity, PACRIM'07, pp. 42-45.*

(Continued)

*Primary Examiner* — Cheyne D Ly
(74) *Attorney, Agent, or Firm* — Young & Thompson

(57) ABSTRACT

In the provided document clustering system (100), a concept tree structure accumulation unit (11) stores a concept tree structure that represents a hierarchical relationship among concepts represented by each of a plurality of words. For any two words, a concept similarity computation unit (12) obtains a concept similarity, which is an index indicating how close the concepts represented by the two words are. Using concept similarities for words that appear in two documents in a document set, an inter-document similarity computation unit (13) obtains an inter-document similarity, which indicates how similar the two documents are semantically. A clustering unit (14) uses inter-document similarities to cluster the documents in the document set.

20 Claims, 14 Drawing Sheets

(56) References Cited

OTHER PUBLICATIONS

Toshihiro Kamishima: "A Survey of Recent Clustering Methods for Data Mining (Part 1)-Try Clustering-", JSAI Journal, vol. 18, No. 1, pp. 59-65, (2003), only translated abstract has been considered.
Ryutaro Ichise: "Effective Features for Judging Ontology Mapping", Journal of the Japanese Society for Artificial Intelligence, vol. 22, 2E1-1, 2008, only translated abstract has been considered.
Hiroyuki Shinnou, Minoru Sasaki, Koji Murakami: "Semi-supervised Clustering through Modification using Constraints", Workshop on Information-Based Induction Science, 2006, only translated abstract has been considered.
International Search Report PCT/JP2010/073042 dated Feb. 22, 2011, with English translation.

* cited by examiner

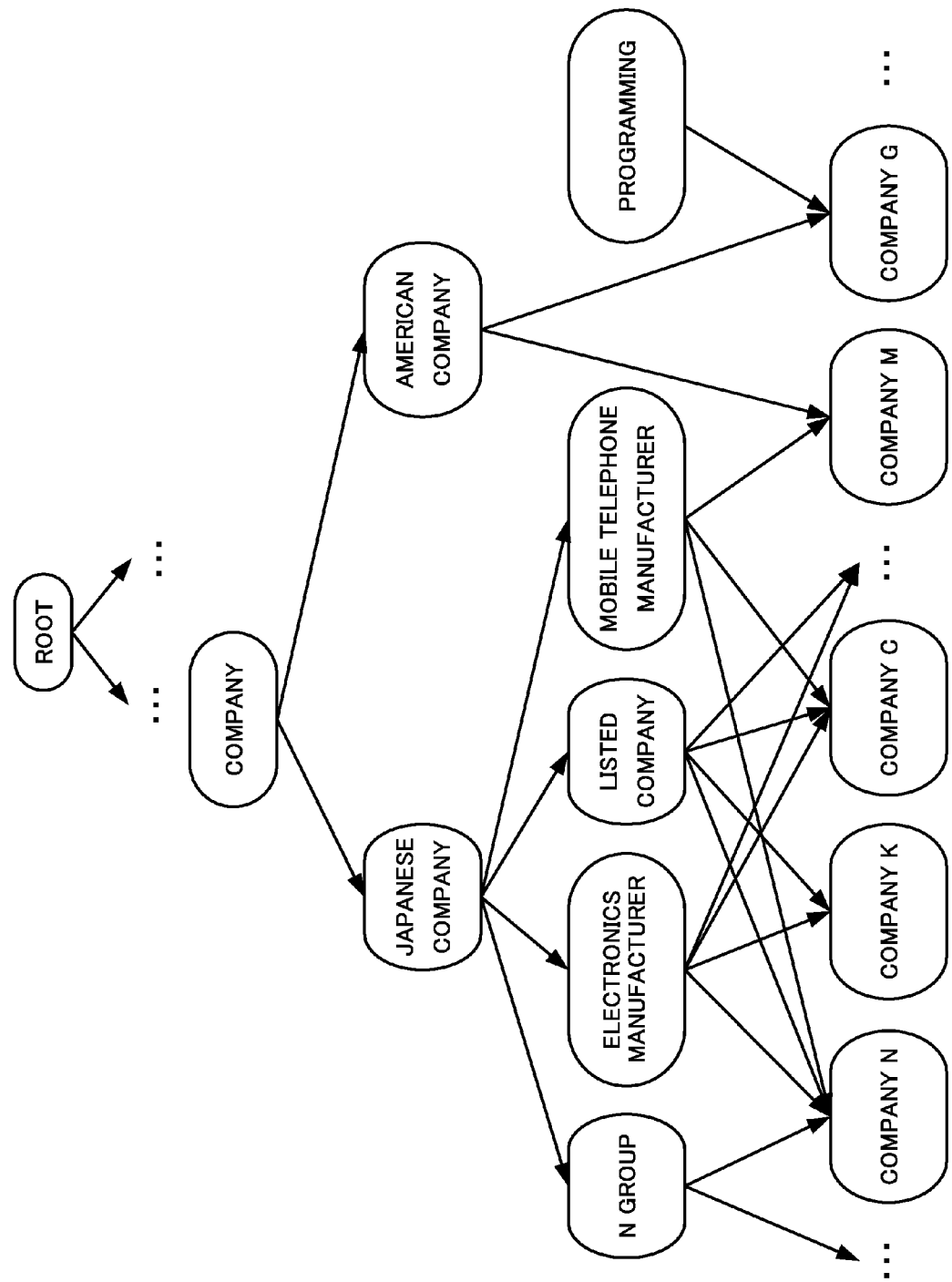

FIG.3

| ID | CONTENTS |
|---|---|
| D1 | COMPANY N SETTLEMENT ANNOUNCEMENT, 10% UPWARD CORRECTION. HIGHEST PROFIT EVER AT SETTLEMEMT. |
| D2 | COMPANY C SETTLEMENT ANNOUNCEMENT, MOBILE TELEPHONE COOPERATION WITH COMPANY D IS FAVORABLE. |
| D3 | COMPANY N ANOUNCES NEW PROGRAMMING LANGUAGE. PARTNERSHIP WITH COMPANY S. |
| D4 | COMPANY M ALSO HAS UPWARD CORRECTION AT SETTLEMENT. AFFECTED BY PROFIT INCREASE IN AMERICA. |
| ⋮ | ⋮ |

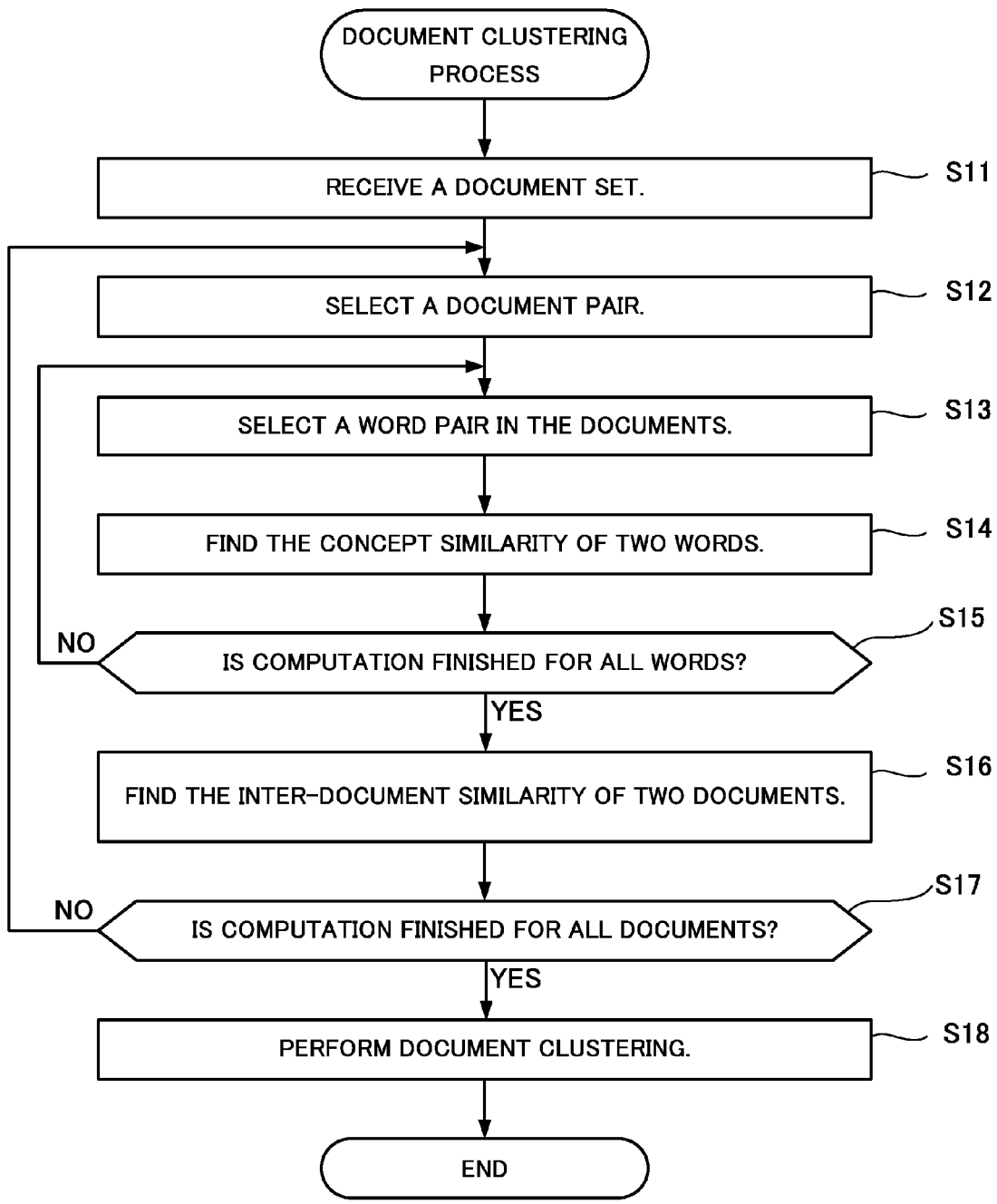

FIG.6

| WORD | CO-OCCURRING WORD | CO-OCCURRENCE |
|---|---|---|
| N GROUP | n COMPANY | 0.5 |
| N GROUP | N COMPANY | 0.4 |
| ELECTRONICS MANUFACTURER | IT | 0.3 |
| ELECTRONICS MANUFACTURER | SOLUTION | 0.2 |
| LISTED COMPANY | SETTLEMENT | 0.2 |
| LISTED COMPANY | STOCK PRICE | 0.2 |
| MOBILE TELEPHONE MANUFACTURER | MOBILE | 0.5 |
| MOBILE TELEPHONE MANUFACTURER | COMPANY D | 0.2 |
| ⋮ | ⋮ | ⋮ |

FIG.12

| INTER-DOCUMENT SIMILARITY | CONSTRAINT CONDITION ||
|---|---|---|
| | MUST | CANNOT |
| $\alpha > \theta 1$ | YES | - |
| $\alpha < \theta 2$ | - | YES |

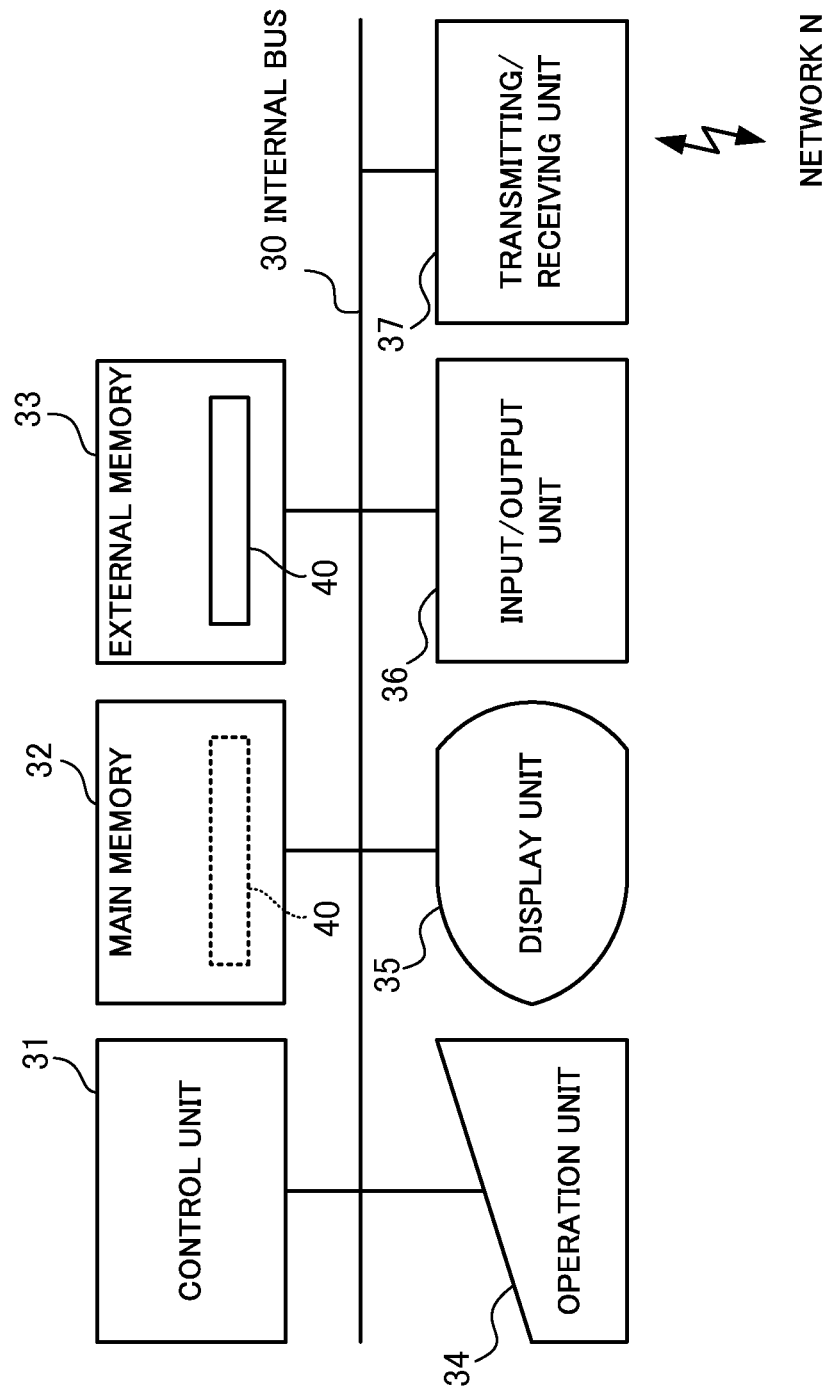

DOCUMENT CLUSTERING SYSTEM, DOCUMENT CLUSTERING METHOD, AND RECORDING MEDIUM

TECHNICAL FIELD

The present invention relates to a document clustering system, a document clustering method and recording medium. Particularly, the present invention relates to a document clustering system, document clustering method and recording medium that uses similarities in concept tree structure between words.

BACKGROUND ART

A document clustering system is a system that takes inputted document sets and sorts similar documents into the same group.

Non-patent literature 1 discloses an example of a document clustering system. The document clustering system that is disclosed in non-patent document 1 places one document as a collection of words, and expresses that document as a vector with each word as an element. When finding similarity, such as cosine similarity, between two documents, the document clustering system disclosed in non-patent literature 1 finds the similarity between the two documents based on distance that is expressed in vector space.

Here, the value of a vector element is a statistical amount such as the frequency that a word appears in each document, or the TFIDF (Term Frequency Inverse Document Frequency) that is based on the frequency of appearance. In the document clustering system disclosed in non-patent literature 1, after the similarity is found, the documents are compiled by a method such as K-MEANS or hierarchical clustering. As a result, documents, in which similar words appear, form one group. Hereafter, a group of similar documents will be called a cluster.

On the other hand, there is an ontology mapping system that takes the input of two concept tree structures that indicated the hierarchical relationship between a plurality of two words, and finds the correspondence of each. Non-patent literature 2 discloses an example of an ontology mapping system. An ontology mapping system is a system that finds what kind of correspondence there is between two different concept tree structures. The similarity between concept tree structures is an index of the similarity of character strings, or an index that is based on knowledge sources that use a concept tree structure graph. Non-patent literature 2 discloses four methods that are based on knowledge sources that use concept tree structure graphs. The methods disclosed in non-patent literature 2 are: (1) a method that uses synonyms; (2) the method of Wu & Palmer et al.; (3) a method that uses explanations; and (4) the method of Lin et al. The method (1) that uses synonyms is a method of finding the similarity by using the lengths of two concept paths of a concept tree structure. The method (2) of Wu & Palmer et al. is a method of finding the similarity according to the equation below based on the depth and least common superconcept (LCS).

$$\text{Similarity }(W1, W2) = 2 \times \text{depth}(\text{LCS})/(\text{depth}(W1) + \text{depth}(W2))$$

Here, W1 and W2 represent words, the depth is the depth of the word in the concept tree structure, and LCS is the LCS (least common superconcept) of W1 and W2.

The method (3) that uses explanations is a method of finding the similarity by presuming that an written explanation is assigned to each word in the concept tree structure, and using that written explanation. The similarity is found based on the square of the length of words that are common in the written explanations of each word. The method (4) of Lin et al. is a method that is similar to the equation in the method of Wu & Palmer et al., however is a method that uses the amount of information instead of the depth of the words in the concept tree structure.

Furthermore, non-patent literature 3 discloses a technique of performing clustering by assigning constraints to document pairs that are targets of clustering. In the clustering with constraints disclosed in non-patent literature 3, clustering is performed so that in addition to objective functions corresponding to similarity, assigned constraints are met.

In addition, patent literature 1 discloses a multi-dimensional space modeling apparatus that sorts documents that are searched. The multi-dimensional space modeling apparatus in patent literature 1 sorts a large quantity of technical documents into several clusters in multi-dimensional space, and creates a cluster map by placing these clusters on a two-dimensional plane. With the multi-dimensional space modeling apparatus disclosed in patent literature 1, the closer the distance is between clusters, the higher the error precision of the obtained cluster map is, and it is possible to know visually the relationship between similar clusters.

RELATED LITERATURE

Patent Literature

Patent Literature 1: Unexamined Japanese Patent Application Kokai Publication No.

Non-Patent Literature

Non-Patent Literature 1: T. Kamishima: "A Survey of Recent Clustering Methods for Data Mining (Part 1)—Try Clustering—", JSAI Journal, Vol. 18, No. 1, pp. 59-65, (2003)

Non-Patent Literature 2: Ryutaro Ichise: "Effective Characteristic Extraction in Ontology Mapping", Journal of the Japanese Society for Artificial Intelligence, Vol. 22, 2E1-1, 2008

Non-Patent Literature 3: Hiroyuki Shinnou, Minoru Sasaki, Koji Murakami: "Semi-supervised Clustering through Modification using Constraints", Workshop on Information-Based Induction Sciences, 2006

SUMMARY OF THE INVENTION

Problem to be Solved by the Invention

The document clustering system disclosed in non-patent literature 1 and the multi-dimensional space modeling apparatus disclosed in patent literature 1 map documents as vectors with appearing words as elements, so it is not possible to express the semantic relationship between words. Actually, proper nouns such as product names, company names and the like are often expressed by completely different names. However, in a conventional document clustering system such as disclosed in non-patent literature 1, when sorting words in a certain category and an attempt is made to sort these kinds of proper nouns in the same category, or when it is determined that there is similarity due to many commonly occurring words, there is a problem in that documents may not be sorted correctly.

Moreover, in the ontology mapping system disclosed in non-patent literature 2, the purpose of the method is not document clustering, but only finding the closeness of words in a concept tree structure. Therefore, there is a problem in that it is not possible to find the number of times words appear or the ratio of appearance of words in an inputted document set.

Furthermore, in the technique disclosed in non-patent literature 3, there are problems in that constraint conditions must be input manually, and much work is required in order to assign precise constraints.

Taking into consideration the problems described above, the object of the present invention is to provide a document clustering system, document clustering method and recording medium that are capable of performing clustering of inputted document sets based on semantic similarity between words in the inputted documents.

Means for Solving the Problems

The document clustering system according to a first perspective of the present invention comprises:
 a concept tree structure acquisition unit that acquires a concept tree structure that represents the hierarchical relationship of a concept of a plurality of words;
 a document set acquisition unit that acquires a document set, which is a collection of documents;
 a concept similarity computation unit that finds the concept similarity between two arbitrary words of the document set that was acquired by the document set acquisition unit, the concept similarity being an index indicating the closeness of the two words in a concept;
 an inter-document similarity computation unit that finds inter-document similarity, which is the degree of semantic similarity between two documents that are included in the document set that was acquired by the document set acquisition unit, based on the concept similarity found by the concept similarity computation unit; and
 a clustering unit that performs document clustering of the document set based on the inter-document similarity that was found by the inter-document similarity computation unit.

Effect of the Invention

With the present invention, it is possible to perform document clustering of an inputted document set based on semantic similarity between words in the inputted documents.

BRIEF DESCRIPTION OF DRAWINGS

FIG. 2 is a drawing illustrating an example of concept tree structure;
FIG. 3 is a drawing illustrating an example of a document set;
FIG. 4 is a flowchart illustrating an example of the operation of the document clustering process of a first embodiment;
FIG. 6 is a drawing illustrating an example of co-occurring patterns that are stored together with a concept tree structure;
FIG. 12 is a drawing illustrating an example of constraint conditions;
FIG. 14 is a block diagram illustrating an example of the hardware construction of a document clustering system of the present invention

MODES FOR CARRYING OUT THE INVENTION

Figure 1:
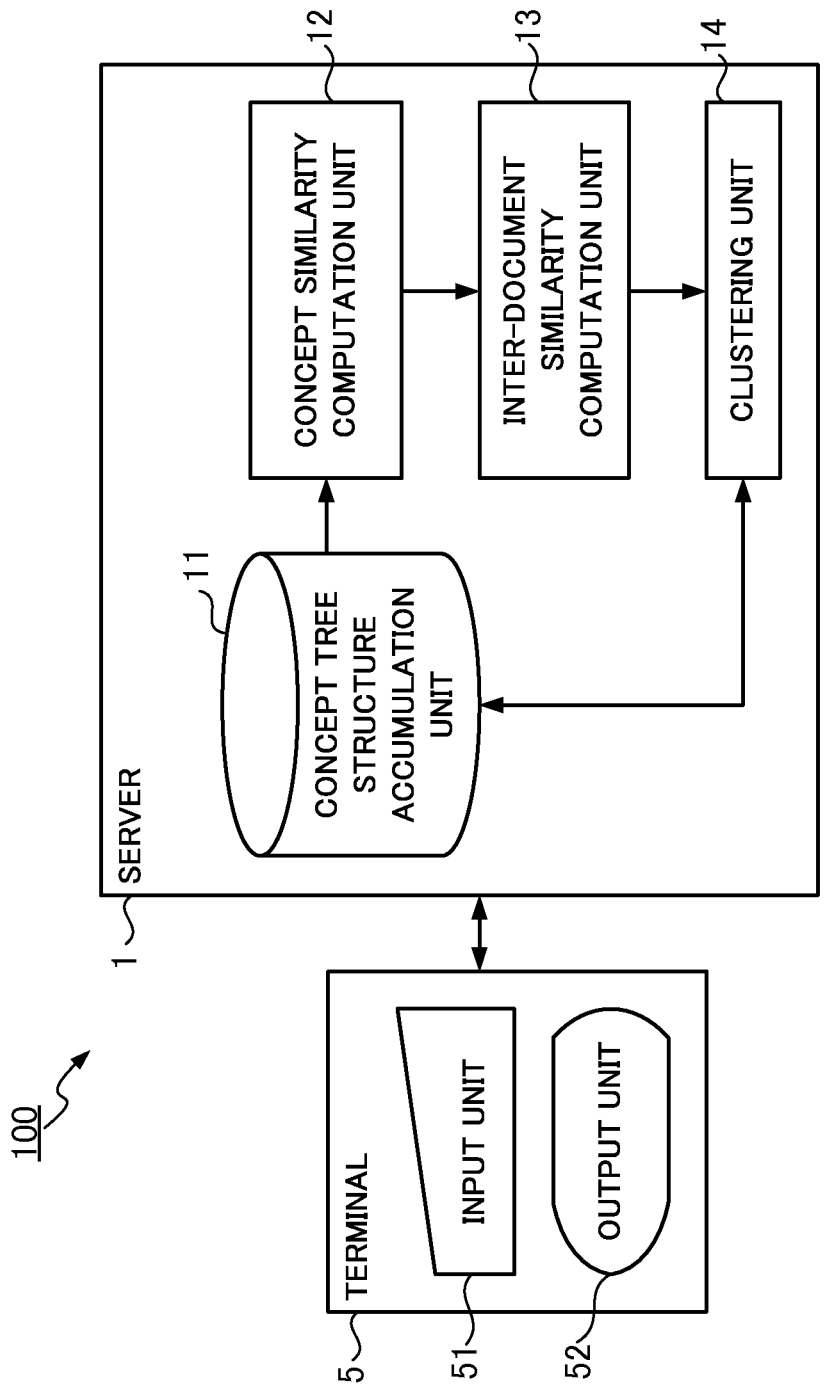
FIG. 1 is a block diagram illustrating an example of the construction of the document clustering system of a first embodiment of the present invention.

Embodiments of the present invention will be explained in detail below with reference to the accompanying drawings. In the drawings, the same reference numbers will be given to identical or equivalent parts.

Embodiment 1

As illustrated in FIG. 1, the document clustering system 100 of a first embodiment comprises a server 1 and a terminal 5. The server 1 comprises a concept tree structure accumulation unit 11, a concept similarity computation unit 12, an inter-document similarity computation unit 13, and a clustering unit 14, and using the concept tree structure and frequency of appearance of words in inputted documents, performs clustering of an inputted document sets based on semantic similarity between words. The terminal 5 comprises an input unit 51 and output unit 52, and performs input and output of information to the server 1. The server 1 and terminal 5 can be connected via a network or the like, or the server 1 can be constructed so as to comprise a terminal 5. The frequency of appearance is not the rate at which words in the documents appear, but is the number of times, and this will be the same in any explanations hereafter.

The concept tree structure accumulation unit 11 stores concept tree structure (more precisely, data that expresses concept tree structure, and this will be the same in any explanations hereafter) between a plurality of words such as illustrated in FIG. 2. The hierarchical relationship of concepts between words is stored in network structure, or in a directed acyclic graph (DAG) structure. The concept tree structure accumulation unit 11 stores concept tree structure beforehand, however, is not limited to this, and can also learn the concept tree structure during operation of the system.

Returning to FIG. 1, the concept similarity computation unit 12 first receives a document set such as illustrated in FIG. 3 that was inputted to the server 1 by the input unit 51 of the terminal 5, and extracts words that are included in each document. The concept similarity computation unit 12 references to the document set and the concept tree structure that is stored by the concept tree structure accumulation unit 11, and finds an index, or in other words, concept similarity between words, of how close two words that are extracted from each document of a document set are located in the concept tree structure.

As illustrated in FIG. 3, a document set that is received from the terminal 5 includes a plurality of documents, and each document is given an ID for identifying the document.

Returning to FIG. 1, the inter-document similarity computation unit 13 finds the conceptual distance between words that appear in two documents that are compared based on the concept similarity between words found by the concept similarity computation unit 12, and finds the semantic similarity between documents based on the conceptual distance that was found. Moreover, the inter-document similarity computation unit 13 can also assign weighting based on the frequency of appearance of words in documents.

The clustering unit 14 performs clustering of documents based on the semantic similarity between two documents that was found by the inter-document similarity computation unit 13. Document clustering is performed by a method such as coagulation method, K-MEANS and the like based on the similarity between two documents.

When the document set illustrated in FIG. 3 is inputted, the concept tree structure that is stored by the concept tree structure accumulation unit 11 has a DAG structure with root as the root as illustrated in FIG. 2. Here, root is the starting point at the very top of the concept tree structure. A word (starting point) from which an arrow is pointed toward a certain word is a word of a superconcept, and a word toward which an arrow is pointed (ending point) is a subordinate concept. For example, "Group N", "Electronics Manufacturer", "Listed Company" and "Mobile Telephone Manufacturer" are each superconcept words of "Company N" (hereafter, called higher-order words). Moreover, "Electronics Manufacturer" and "Listed Company" are higher-order words of "Company K" and "Company C".

In this embodiment, words that are subordinate concept words to a certain word (arbitrary collection of words) are words of a subordinate category (called subordinate category words). Moreover, in this embodiment, when a certain higher-order word is a higher-order word that is common with any one of two or more subordinate category words, that higher-order word is called a common higher-order word. Furthermore, in this embodiment, the lowest common higher-order word of a certain concept category of common higher-order words is called the least common higher-order word. In the example of FIG. 2, "Electronics Manufacturer" and "Listed Company" are least common higher-order words of "Company N", "Company K" and "Company C". "Japanese Company" is a common higher-order word of "Company N", "Company K" and "Company C", however, is not a least common higher-order word. In this embodiment, of the common higher-order words, mainly the least common higher-order words are used, so in the explanation below least common higher-order words will simply be referred to as common higher-order words.

Next, the operation of the document clustering system 100 will be explained with reference to FIG. 1 to FIG. 3. It is presumed that the concept tree structure accumulation unit 11 stores the concept tree structure illustrated in FIG. 2 beforehand. Moreover, the document set that is the object of the clustering that will be performed is the document set illustrated in FIG. 3.

The concept similarity computation unit 12 first receives the document set that was inputted to the server 1 by the input unit 51 of the terminal 5, and extracts words included in each document. The concept similarity computation unit 12 references to the document set and the concept tree structure that is stored by the concept tree structure accumulation unit 11, and finds the concept similarity between words that are extracted from each document.

More specifically, the concept similarity computation unit 12, in the concept tree structure that is stored by the concept tree structure accumulation unit 11, finds concept similarity by the ratio of the number of documents among the inputted documents in which either two least common higher-order words or subordinate category words of those higher-order words appear, and the number of documents among the inputted documents in which two words appear in each. In other words, the concept similarity is a value that becomes higher when the frequency of the appearance of higher-order words in inputted documents, and the frequency of the appearance of two words in each of the inputted documents are the same.

For example, the word "Company N" and the word "Company C" and the common higher-order word "Mobile Telephone Manufacturer" will be explained. When documents in which the subordinate category words of the word "Mobile Telephone Manufacturer" appear are the same as documents that include the word "Company N" or the word "Company C", the concept similarity becomes high. Therefore, word "Company N" is similar to the word "Company C". The word "Company N" and the word "Company G" and the common higher-order word "Company" will be explained. It is expected that there will be many documents other than the documents that include the word "Company N" or the word "Company G" among the documents in which subordinate category words of the word "Company" appear. Therefore, the concept similarity of the word "Company N" and the word "Company G" becomes low. However, in the case of a word that is not stored in the concept tree structure accumulation unit 11, the concept similarity is found as words having no hierarchical conceptual relationship with other words being stored in the concept tree structure accumulation unit 11.

Next, the method of finding the concept similarity will be explained in detail. The concept similarity between words is expressed by the following equation.

Concept similarity $(w1,w2) = 2 \times \log(P(\text{higher-order words }(w1,w2)))/(\log(P(w1)) + \log(P(w2)))$ $P(w) = DF(w)/DF\_ALL$ Here, w1 and w2 represent two words that are inputted. Higher-order words (w1, w2) represents a collection of common higher-order words that are closest to the two words. DF(w) is the frequency of documents in which a word w and subordinate words to that word appear, or is the frequency of documents in which a word from a collection of words w and subordinate words to that word appear, and DF_ALL is the total number of inputted documents. P(w) is the ratio of the number of documents in which a word w and the subordinate words to that word appear with respect to the total number of inputted documents. In other words, P(w) can be thought to be the probability that a word w will occur, so the concept similarity (w1, w2) is the amount of information for higher-order words (w1, w2) with respect to the total amount of information for the words w1 and w2 (the amount of information about the occurrence of the words w1 and w2). The document frequency is the number of documents and is not the ratio of documents in which a word appears, and this will be the same hereafter as well.

The concept similarity computation unit 12 finds the difference between the information amount of the common concept (higher-order words) of two words in an inputted document set and the information amount of each of the two words. When doing this, when the difference in the information amounts above is small, the two words are considered to be conceptually close, and the concept similarity (w1, w2) becomes large. When the difference between the information amounts above is large, the two words are considered to be conceptually far apart, and the concept similarity (w1, w2) becomes small.

In the case of words that do not exist in the concept tree structure, or in other words, in the case of words that are not stored by the concept tree structure accumulation unit 11, the concept similarity computation unit 12 finds the concept similarity as the result of adding a word that does not have a hierarchical relationship with the concept to the concept tree structure. As a result, the concept similarity computation unit 12 can find the concept similarity of words that exist in the inputted documents, but do not exist in the concept tree structure.

Furthermore, when there is no collection of common higher-order words that are closest to two words, in other words, when higher-order words (w1, w2) is an empty set, the document frequency DF(w) becomes 0, and the document appearance ratio P (higher-order words (w1, w2)) becomes 0. Here, log(0) cannot actually be found, however, the concept similarity is taken to be concept similarity (w1, w2)=0. As a result, when there are no common higher-order words, or in other words, even when two words are not connected inside the concept tree structure, the concept similarity computation unit 12 can find the concept similarity.

Furthermore, when the two words are the same word, or in other words, in the case of higher-order words (w1, w1), the collection of common higher-order words that are closest is the word itself, or in other words, is word w1. As a result, the concept similarity computation unit 12 can find the concept similarity between the same words as the highest similarity of 1.

The equation for the concept similarity described above is an example, and it is also possible for the concept similarity computation unit 12 to use the word frequency instead of the document frequency DF(w) and the document frequency of the total number of inputted documents DF_ALL. The word frequency is the number of times that a word appears in a document and not the ratio of appearance, and this is also the same in explanations hereafter. The concept similarity computation unit 12 can also simply use a ratio without finding the logarithm. When there is a word that does not appear in the inputted documents even once, but does appear in the concept tree structure, the concept similarity computation unit 12 can correct the document frequency and word frequency by using a method such as the additional smoothing method.

In other words, the concept similarity can be defined such that it is a maximum when the frequency of appearance of common higher-order words or words in a subordinate category to the higher-order words in a document set coincides with the frequency of appearance of each of two words in the document set, and is a minimum when there are no higher-order words of the two words in the concept tree structure, and does not need to be limited to the equation above.

In the following, in order to make the explanation easier to understand, a detailed example of a method for finding the concept similarity in the case where all of the words in the concept tree structure stored by the concept tree structure accumulation unit 11 appear at least one time or more in the inputted documents.

For example, concept similarity will be explained for the word "Company N" and the word "Company C". First, referencing to the concept tree structure illustrated in FIG. 2, the following words are found to be the closest common higher-order words.

Higher-order words (Company N, Company C)={Electronics Manufacturer, Listed Company, Mobile Telephone Manufacturer}

Here, the document frequency will be explained to be as follows:
DF (Company N)=4
DF (Company C)=5
DF (Company K)=4
DF_ALL=20

Moreover, in order to make the explanation easier to understand, the subordinate category words for the word "Electronics Manufacturer" will only be "Company N", "Company K" and "Company C". The subordinate category words for the word "Listed Company" will only be "Company N", "Company K" and "Company C". Furthermore, the subordinate category words for the word "Mobile Telephone Manufacturer" will only be "Company N", "Company K" and "Company M". In this case, document frequency DF (higher-order words (Company N, Company C)) is the document frequency in the inputted document set that some of these words are contained. Documents that contain two or more of the words are counted as 1, and there are no documents having a duplicate count. As a result, the case when the document frequency becomes as follows will be explained.

DF (higher-order words (Company N, Company C))=7

When finding the concept similarity using these, the concept similarity can be found as below.

$$P(\text{higher-order words (Company } N, \text{ Company } C)) =$$
$$DF(\text{higher-order words (Company } N, \text{ Company } C))/\text{DF\_ALL} = 7/20$$
$$P(\text{Company } N) = DF(\text{Company } N)/\text{DF\_ALL} = 4/20$$
$$P(\text{Company } C) = DF(\text{Company } C)/\text{DF\_ALL} = 5/20$$

Concept similarity (Company $N$, Company $C$) =
$$2 \times \log (P(\text{higher-order words (Company } N, \text{ Company } C))/$$
$$(\log (P(\text{Company } N)) + \log (P(\text{Company } C))) =$$
$$2 \times \log(7/20)/(\log(4/20) + \log(5/20)) =$$
$$2 \times (-0.456)/(-0.699 - 0.602) = 0.701$$

Similarly, the concept similarity of the word "Company N" and the word "Company G" is found. Here, the higher-order words, and the document frequency are explained as below.
Higher-order words (Company N, Company G)={Company}
DF (Company G)=3
DF (higher-order words (Company N, Company G))=DF (Company)=19

As a result, the concept similarity is found as below.

Concept similarity (Company $N$, Company $G$) =
$$2 \times \log (P(\text{higher-order words (Company } N, \text{ Company } G)))/$$
$$(\log(P(\text{Company } N)) + \log (P(\text{Company } G))) =$$
$$2 \times \log (19/20)/(\log(4/20) + \log(3/20)) =$$
$$2 \times (-0.022)/(-0.699 - 0.824) = 0.029$$

Moreover, in the case of finding the concept similarity of a word not in the concept tree structure, or in other words, the word "Settlement" that is not stored by the concept tree structure accumulation unit 11 and the word "Company N" will be explained. The word "Settlement" is a word that does not have s hierarchical relationship with the concept in the concept tree structure that is stored by the concept tree structure accumulation unit 11, and when assuming it is in the concept tree structure, the higher-order words are as below.

Higher-order words (Settlement, Company N)={σ} (empty set)

Here, the document frequency is explained as below.

DF (Settlement)=5

Presuming that log(0)=0, the concept similarity is found as below.

$$DF \text{ (higher-order words (Settlement, Company } N)) = 0$$

$$P \text{ (higher-order words (Settlement, Company } N)) = 0$$

Conept similarity (Settlement, Company $N$) =

$$2 \times \log (P \text{ (higher-order words (Settlement, Company } N)))/$$

$$(\log (P \text{ (Settlement)}) + \log (P \text{ (Company } N))) =$$

$$2 \times \log (0/20)/(\log (5/20) + \log (4/20)) = 0$$

In the case of the same word, for example, in the case of the word "Settlement" and the word "Settlement", the concept similarity is found as below.

Concept similarity (Settlement, Settlement) =

$$2 \times \log (P \text{ (higher-order words (Settlement, Settlement))}/$$

$$(\log (P \text{ (Settlement)}) + \log (P \text{ (Settlement)})) =$$

$$2 \times \log (5/20)/(\log (5/20) + \log (5/20)) = 1$$

The concept similarity computation unit 12 finds the concept similarity as described above. The concept similarity described above is a maximum (=1) when the frequency of appearance of common higher-order words or words of a subordinate category of the words in a document set coincides with the frequency of appearance of each of two words in a document set (in the example above, the word "Settlement" and the word "Settlement"). The concept similarity is a minimum (=0) when there are no common higher-order words of two words in a concept tree structure (in the example above, the word "Settlement" and the word "Company N").

The inter-document similarity computation unit 13 finds the inter-document similarity based on the average sum of the concept similarity of all word pairs that are extracted from the inputted document set. More specifically, the inter-document similarity computation unit 13 first divides the words in sentences that appear in two documents into word arrays. Then, the inter-document similarity computation unit 13 takes the sum of the concept similarity of the word sets that appear in one document, and the concept similarity of arbitrary combinations of word sets that appear in the other document, or the value obtained by normalizing this sum by the number of words, as the inter-document similarity. When doing this, the inter-document similarity computation unit 13 can assign weighting to the found sum using the number of words appearing in the documents.

For example, the inter-document similarity can be found using the equation below.

Inter-document similarity $(d1,d2)=\Sigma\Sigma(PT(wd1i,d1) \times PT(wd2j,d2) \times$ concept similarity $(wd1i,wd2j)$ $PT(w,d)=TF(w,d)/|d|$ Here, d1 and d2 are the two target documents, and wd1$i$ and wd2$j$ are the $i$th word of document d1, and the $j$th word of document d2. The symbol $\Sigma\Sigma$ means to find the sum of the concept similarity for all combinations of wd1$i$ and wd2$j$. Moreover, TF (w, d) is the frequency of appearance of the word w in the document d, and |d| is the total number of words in the document d, or in other words is the length of the document. Therefore, PT (w, d) is the relative frequency of a word in a document.

The inter-document similarity is the result of multiplying the sum of the concept similarity of word pairs that appear in the two documents by the weighting of the relative frequency of each word. For example, the case of finding the inter-document similarity of a document D1 and document D2 will be explained. The words that appear in document D1 and document D2 are given below.

Document D1={Company N, Settlement, Announcement, 10, %, Upward, Correction, Ever, Highest, Profit}

Document D2={Company C, Settlement, Announcement, Mobile, Telephone, Cooperation, Company D, Favorable}

Of these words, the word "Settlement" appears two times in document D1, and other words appear one time. As a result, the length of the documents becomes the values below, and the inter-document similarity is expressed as below.

|Document $D1$| = 11

|Document $D2$| = 8

Inter-document similarity (Document $D1$, Document $D2$) =

$$\sum \sum PT \text{ (Document } D1i, \text{ Document } D1) \times$$

$$PT \text{ (Document } D2j, \text{ Document } D2) \times \text{Concept}$$

similarity (Document $D1i$, Document $D2j$) =

$PT$ (Company $N$, Document $D1$) $\times PT$ (Company $C$, Document $D2$) $\times$ Concept similarity (Company $N$, Company $C$) +

$PT$ (Company $N$, Document $D1$) $\times PT$ (Settlement, Document $D2$) $\times$ Concept similarity (Company $N$, Settlement) +

$PT$ (Company $N$, Document $D1$) $\times PT$ (Announcement, Document $D2$) $\times$ Concept similarity (Company $N$, Announcement) + ... +

$PT$ (Profit, Document $D1$) $\times PT$ (Favorable, Document $D2$) $\times$

Concept similarity (Profit, Favorable)

Here, the words in the concept tree structure, or in other words, the words that are stored by the concept tree structure accumulation unit 11 are regarded as being "Company N", "Company C", "Company D", "Highest" and "Favorable". The concept similarity of the same word is 1, and the concept similarity of words these words and a word that is not in the concept tree structure, or in other words, a word that is not stored by the concept tree structure accumulation unit 11 is 0, so the inter-document similarity is found as below.

Inter-document similarity (Document $D1$, Document $D2$) =

$PT$ (Company $N$, Document $D1$) $\times PT$ (Company $C$, Document $D2$) $\times$ Concept similarity (Company $N$, Company $C$) +

$PT$ (Company $N$, Document $D1$) $\times PT$ (Company $D$, Document $D2$) $\times$ -continued Concept similarity (Company $N$, Company $D$) +

$PT$ (Company $N$, Document $D1$) × $PT$ (Favorable, Document $D2$) ×

Concept similarity (Company $N$, Favorable) +

$PT$ (Settlement, Document $D1$) × $PT$ (Settlement, Document $D2$) × 1 +

$PT$ (Announcement, Document $D1$) ×

$PT$ (Announcement, Document $D2$) × 1 +

$PT$ (Highest, Document $D1$) × $PT$ (Company $C$, Document $D2$) ×

Concept similarity (Highest, Company $C$) +

$PT$ (Highest, Document $D1$) × $PT$ (Company $D$, Document $D2$) ×

Concept similarity (Highest, Company $D$) +

$PT$ (Highest, Document $D1$) × $PT$ (Favorable, Document $D2$) ×

Concept similarity (Highest, Favorable)

The concept similarity of a combination of typical words and proper nouns such as the concept similarity (highest, company C), found from the method described above, is a very low value such as 0.002n. In the case of typical words such as concept similarity (highest, favorable) that are close in the concept tree structure that is stored by the concept tree structure accumulation unit 11, the concept similarity becomes a high value such as 0.660. When the concept similarities are values such as this, the inter-document similarity is found as below.

Inter-document similarity (Document $D1$, Document $D2$) =

$1/12 \times 1/8 \times 0.701 + 1/12 \times 1/8 \times 0.660 + 1/12 \times 1/12 \times 0.002 +$ $2/12 \times 1/8 \times 1 + 1/12 \times 1/8 \times 1 + 1/12 \times 1/8 \times 0.002 +$ $1/12 \times 1/8 \times 0.002 + 1/12 \times 1/8 \times 0.660 = 0.052$ Similarly, the case of finding the inter-document similarity of document D1 and document D3 will be explained. The words that appear in document D3 are as below, and the inter-document similarity is found as below.

Document $D3$ = {Company $N$, ProgrammingLanguage,

Announcement, Company $S$, Partnership}

Inter-document similarity (Document $D1$, Document $D3$) =

$\sum\sum$ ($PT$ (Document $D1i$, Document $D1$) ×

$PT$ (Document $D3j$, Document $D3$) × Concept similarity (Document $D1i$, Document $D3j$) =

$PT$ (Company $N$, Document $D1$) × $PT$ (Company $N$, Document $D3$) × Concept similarity (Company $N$, Company $N$) +

$PT$ (Company $N$, Document $D1$) × $PT$ (ProgrammingLanguage, Document $D3$) × Concept similarity (Company $N$, ProgrammingLanguage) +

$PT$ (Company $N$, Document $D1$) × $PT$ (Announcement, Document $D3$) × Concept -continued similarity (Company $N$, Announcement) +

... + $PT$ (Profit, Document $D1$) × $PT$ (Partnership,

Document $D3$) × Concept similarity (Profit, Favorable) =

$PT$ (Company $N$, Document $D1$) × $PT$ (Company $N$,

Document $D3$) × 1 + $PT$ (Company $N$, Document $D1$) ×

$PT$ (ProgrammingLanguage, Document $D3$) × Concept similarity (Company $N$, ProgrammingLanguage) +

$PT$ (Company $N$, Document $D1$) × $PT$ (Company $S$, Document $D3$) × Concept similarity (Company $N$, Company $S$) = $1/12 \times 1/5 \times 1 +$ $1/12 \times 1/5 \times 0.04 + 1/12 \times 1/5 \times 0.66 = 0.028$ Document D1 and document D2 are both earnings announcement articles from the same business, and document D1 and document D3 are articles from the same company having different contents. Therefore, the inter-document similarity of the former is higher. The inter-document similarity calculation unit 13 finds the inter-document similarity as described above.

The clustering unit 14 performs clustering of documents based on the similarity between two documents using a method such as the coagulation method or K-MEANS. The similarity is a measure of similarity (log of the distance) between two documents having the inter-document similarity that was found by the inter-document similarity computation unit 13. By the clustering unit 14 performing clustering of documents, documents having a close semantic distance between the documents (documents having a high inter-document similarity) are placed in the same cluster.

For example, in the coagulation method, each document is taken to be a cluster of single elements, and the clustering unit 14 forms a cluster set C={C1, ..., Cn}. Next, the clustering unit 14 selects cluster pairs Ci and Cj that are similar originally. When doing this, the method for measuring the similarity between Ci and Cj is the shortest distance method that uses the inter-document similarity between documents from Ci and Cj that are the most similar, or the longest distance method that uses the inter-document similarity between documents from Ci and Cj that are the least similar. Next, the clustering unit 14 combines Ci and Cj and adds a new cluster Cnew to the cluster set, and deletes Ci and Cj. The clustering unit 14 repeats combining similar documents until the number of clusters of the cluster set becomes the same as a value set beforehand for the system.

In the K-MEANS method, which is also called the K-MEDOID method, the clustering unit 14 first randomly selects K number of data, the value K being randomly set beforehand for the system, and takes this to be the center of the initial cluster. Next, the clustering unit 14 places all of the documents in a cluster of the cluster center. Then the clustering unit 14 reselects center cluster data from each cluster. When doing this, the clustering unit 14 selects documents whose sum of inter-document similarity with all of the documents in the cluster is the highest. Furthermore, the clustering unit 14 places all of the documents in the cluster of the closest cluster center selected before. The clustering unit 14 repeats updating the cluster centers and placing documents in the clusters until there are no more updated cluster centers.

The document clustering system 100 as described above operates as illustrated in FIG. 4. The concept tree structure accumulation unit 11 stores a concept tree structure in advance.

The input unit 51 of the terminal 5 inputs a document set to the server 1 of the document clustering system 100, and the document clustering system 100 receives that document set (step S11). The concept similarity computation unit 12 selects a document pair by extracting two documents from the document set (step S12). Then, the concept similarity computation unit 12 selects a word pair by extracting words from each of the documents (step S13), and finds the concept similarity for those two words (step S14). When the concept similarity has not been found for all of the word pairs (step S15: NO), processing returns to step S13.

After finding the concept similarity for all of the word pairs (step S15: YES), the inter-document similarity computation unit 13 finds the inter-document similarity for two documents based on the concept similarities that were found (step S16). When the inter-document similarity has not been found for all document pairs (step S17: NO), processing returns to step S12.

After the inter-document similarity for all document pairs has been found (step S17: YES), the clustering unit 14 performs document clustering processing based on the inter-document similarity that was found (step S18), and then ends the operation of the document clustering process.

As was explained above, with the first embodiment, the document clustering system 100, by using a concept tree structure and the frequency of appearance of words in inputted documents, and taking into consideration the semantic similarity between words, is able to sort an inputted document set.

Moreover, by using the similarity between words in a concept tree structure, the document clustering system 100 is able to determine the similarity. Therefore, the document clustering system 100 is able to perform clustering of documents even when the character strings of words are different.

Embodiment 2

Figure 5:
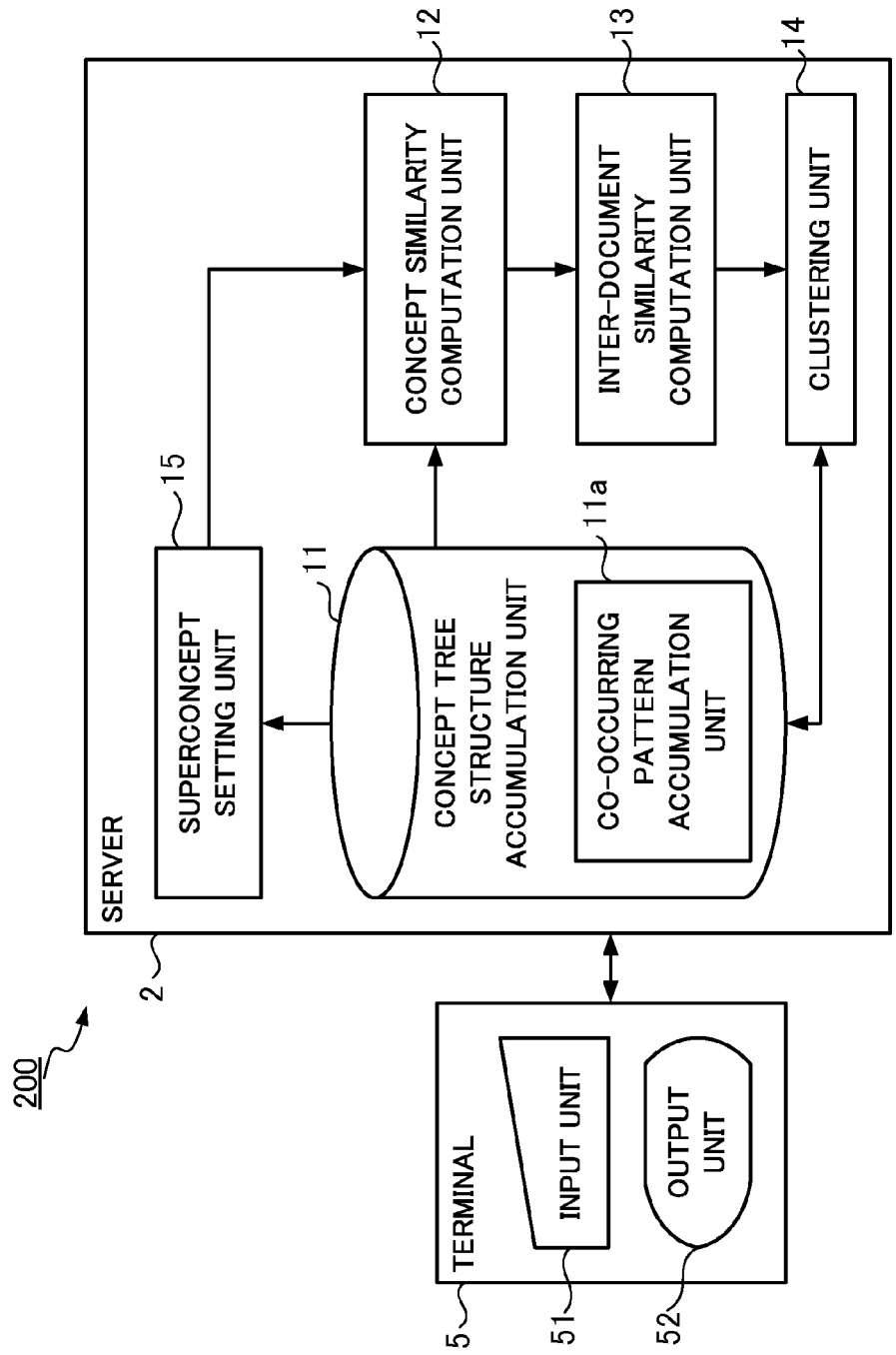
FIG. 5 is a block diagram illustrating an example of the construction of a document clustering system of a second embodiment of the present invention.

In the explanation below, the same reference numbers are given to component elements that are the same as in the embodiment described above, and explanations of those elements are omitted. As illustrated in FIG. 5, in addition to the construction of the first embodiment, the server 2 of the document clustering system 200 of this second embodiment comprises a superconcept setting unit 15, and the concept tree structure accumulation unit 11 comprises a co-occurring pattern accumulation unit 11a. The document clustering system 200 stores co-occurring patterns for each of the words in the concept tree structure, and performs document clustering based on more common superconcepts.

The co-occurring pattern accumulation unit 11a stores co-occurring patterns for each of the words of a concept in the concept tree structure that is stored by the concept tree structure accumulation unit 11. The co-occurring pattern accumulation unit 11a, similar to the concept tree structure accumulation unit 11, stores co-occurring patterns in advance, however, is not limited to this, and can also learn co-occurring patterns during system operation.

The superconcept setting unit 15, using two words and the context of each word in the documents as input, references to the co-occurring patterns that are stored by the co-occurring pattern accumulation unit 11a, and of the higher-order words of the two words, finds the co-occurring patterns in the context and the higher-order words having the same co-occurring patterns in the concept, and takes the words that are found to be higher-order words.

As illustrated in FIG. 6, the co-occurring patterns that are stored by the co-occurring pattern accumulation unit 11a are stored together with the concept tree structure. The concept tree structure that is stored by the concept tree structure accumulation unit 11 is presumed to be as the example illustrated in FIG. 2. Even in the case of the same word, the co-occurrence of co-occurring words is different, and words having a large value of co-occurrence are selected as superconcepts.

Next, the operation when the superconcept setting unit 15 selects a superconcept using co-occurring patterns will be explained. The co-occurring pattern accumulation unit 11a stores co-occurring patterns for each word in a concept of the concept tree structure that is stored by the concept tree structure accumulation unit 11. For example, the co-occurring pattern accumulation unit 11a stores the co-occurring patterns illustrated in FIG. 6. Here, the concept tree structure accumulation unit 11 stores a concept tree structuere and the co-occurring pattern accumulation unit 11a stores co-occurring patterns, but they are not limited to this, these could be stored together by one of the units, or by correlating the co-occurring patterns with the words of the concept tree structure, they could be saved in the form of a database.

For example, referencing to FIG. 6, the word "Company N" will be explained. As illustrated in FIG. 2, the higher-order words of the word "Company N" are "Electronics Manufacturer" and "Mobile Telephone Manufacturer". Co-occurring patterns are attached to each of the higher-order words. In other words, the word "Company N" that is related to the word "Electronics Manufacturer" often appears with this co-occurring pattern. The size of the numerical value of the degree of co-occurrence indicates the frequency of co-occurrence with that word.

The superconcept setting unit 15, takes two words and the context of each word in the documents as input, references the co-occurring patterns that are stored by the co-occurring pattern accumulation unit 11a, and of the higher-order words of the two words, finds the co-occurring patterns in the context and the higher-order words having the same co-occurring patterns in the concept, and takes the words that are found to be higher-order words. For example, the pattern that is inputted is taken to be the word "Company N", the word "Company C" and the co-occurring patterns of each in that document. Here, the superconcept setting unit 15 sets the word of the higher-order words "Electronics Manufacturer", "Listed Company" and "Mobile Telephone Manufacturer" to which the two words are close. For words that have a plurality of higher-order words, the meaning that is used differs according to the context in the document.

For example, in the case where the word "Company N" appears in a news article about mobile telephone sales, the meaning of the company is "Mobile Telephone Manufacturer", and when it appears on an article about stock prices, there is a strong meanings as a "Listed Company". The higher-order words found by the superconcept setting unit 15 are used for narrowing down the common higher-order words when the concept similarity computation unit 12 finds the concept similarity.

Next, the operating method by the superconcept setting unit 15 will be explained in detail. The superconcept setting unit 15 narrows down the superconcepts of word pairs. First, the superconcept setting unit 15 references to the inputted document set that was received from the input unit 51 of the terminal 5, and selects the words surrounding the inputted word pairs in the selected documents. Next, the superconcept setting unit 15 references to the co-occurring patterns that are stored by the co-occurring pattern storage unit 11a and compares the previously selected surrounding words and co-occurring patterns of the common higher-order words. When there is the same word, the superconcept setting unit 15 narrows down which portion was written for the higher-order words based on the co-occurring degree.

For example, the case in which the word "Company N" in document D1 and the word "Company C" in document D2 will be explained. First, the superconcept setting unit 15 extracts the words that are within a specified distance from the positions where these words appear in each document, as below.

Co-occurring pattern (Company N)={Settlement, Announcement, 10, %, Upward, Correction, Ever, Highest, Profit}
Co-occurring pattern (Company C)={Settlement, Announcement, Mobile, Telephone, Partnership, Company D, Favorable}

In this detailed example, all of the words in the document are used, however, the words used are not limited to this, it is also possible to use limitations according to distance from the position of appearance, or characteristic words in the documents, and it is also possible to perform syntax analysis and to use independent words that are in a dependency relationship.

When doing this, the following words are the common higher-order words.

Higher-order words (Company N, Company C)={Electronics Manufacturer, Listed Company, Mobile Telephone Manufacturer}

The superconcept setting unit 15 references to the co-occurring patterns that are stored by the co-occurring pattern accumulation unit 11a and compares the co-occurring patterns of the common higher-order words with the co-occurring patterns acquired before. Furthermore, the superconcept setting unit 15 finds the average of the degree of coinciding co-occurring words. In the case where 1 divided by 0 is selected, the value is taken to be 0.

Superconcept (w1, Parent)=1/No. of coinciding co-occurring words×ΣDegree of co-occurrence of coinciding co-occurring words
Superconcept (Company N, Electronics Manufacturer)=1/0× 0=0
Superconcept (Company N, Listed Company)=1/1×0.2=0.2
Superconcept (Company N, Mobile Telephone Manufacturer)=1/0×0=0
Superconcept (Company C, Electronics Manufacturer)=1/0× 0=0
Superconcept (Company C, Listed Company)=1/1×0.2=0.2
Superconcept (Company C, Mobile Telephone Manufacturer)=1/2×(0.5+0.2)=0.35

As a result, it can be seen that "Company N" and "Company C" are context of "Listed Company" or "Mobile Telephone Manufacturer". However, in the example above, in order to measure for each context which part is written for the higher-order words, the superconcept setting unit 15 can use a calculated amount called the mutual information amount based on the frequency of co-occurring words.

Figure 7:
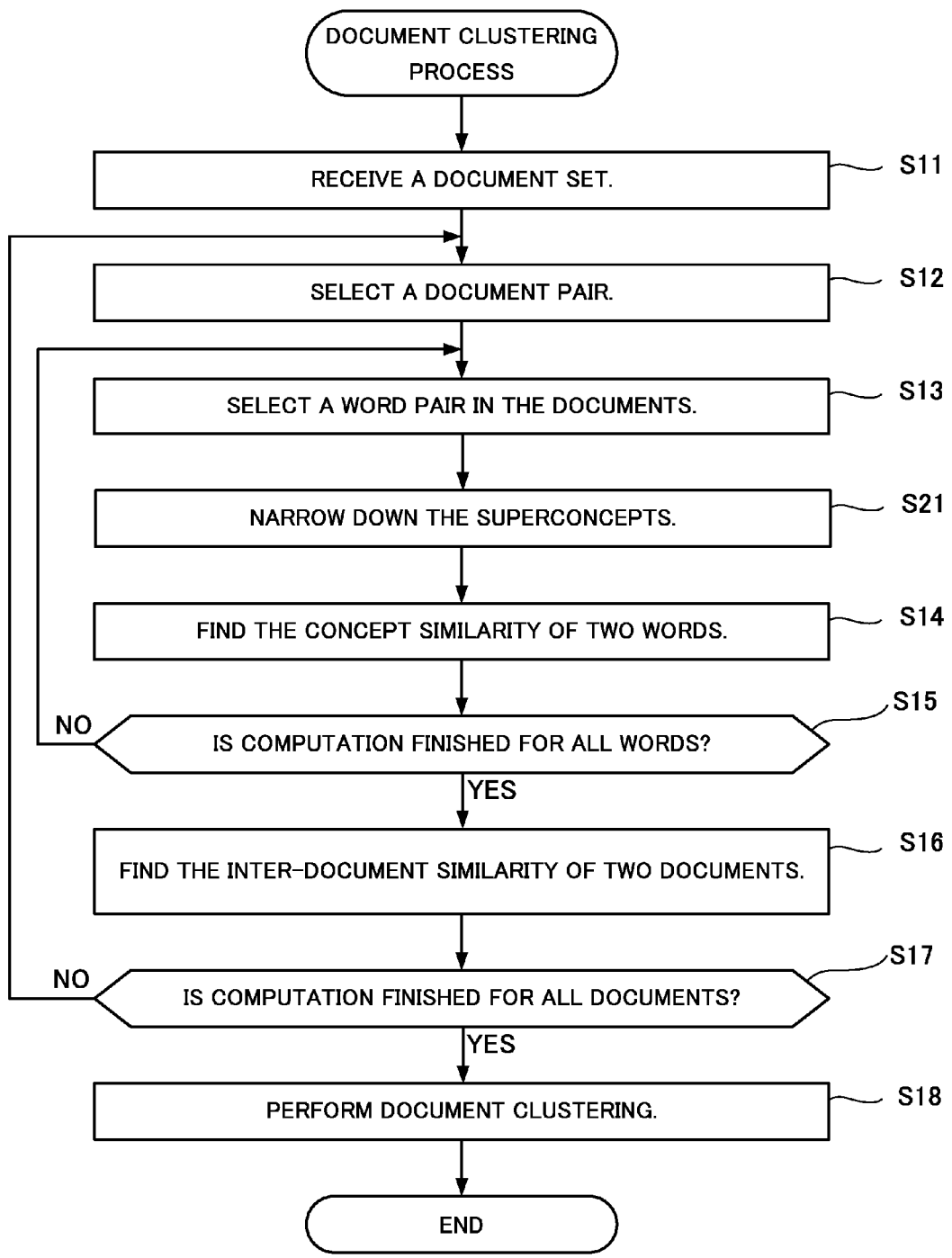
FIG. 7 is a flowchart illustrating an example of the operation of the document clustering process of a second embodiment.

The document clustering system 200 as explained above operates as illustrated in FIG. 7. The concept tree structure accumulation unit 11 stores a concept tree structure beforehand, and the co-occurring pattern accumulation unit 11a stores co-occurring patterns for each word in that concept. The basic flow of the operation of the document clustering process is the same as in the first embodiment.

The input unit 51 of the terminal 5 inputs a document set to the server 2 of the document clustering system 200, and the document clustering system 200 receives that document set (step S11). The concept similarity computation unit 12 selects a document pair by extracting two documents from the document set (step S12). Then, the concept similarity computation unit 12 selects a word pair by extracting words from each of the documents (step S13).

Next, the superconcept setting unit 15 references to the co-occurring patterns that are stored by the co-occurring pattern accumulation unit 11a, then selects superconcepts for the word pair that was selected by the concept similarity computation unit 12 and narrows down the superconcepts having a high degree of co-occurrence (step S21).

The concept similarity computation unit 12 then uses the superconcepts found in step S21, and finds the concept similarity for the two words (step S14). When concept similarity is not found for all the word pairs (step S15: NO), processing returns to step S13.

After concept similarities have been found for all of the word pairs (step S15: YES), the inter-document similarity computation unit 13 finds the inter-document similarity for the two documents based on the concept similarities that were found (step S16). When inter-document similarity is not found for any of the document pairs (step S17: NO), processing returns to step S12.

After inter-document similarities have been found for all of the document pairs (step S17: YES), the clustering unit 14 performs document clustering based on the inter-document similarities that were found (step S18), and the operation of the document clustering process ends.

As explained above, in the case of this second embodiment, the document clustering system 200, by using the concept tree structure and the frequency of appearance of words in the inputted documents, and by taking into consideration the semantic similarity between words, is able to sort an inputted document set.

Moreover, the document clustering system 200 accumulates co-occurring patterns for each of the words in the concept tree structure, so is able to perform document clustering based on more common superconcepts.

Embodiment 3

Figure 8:
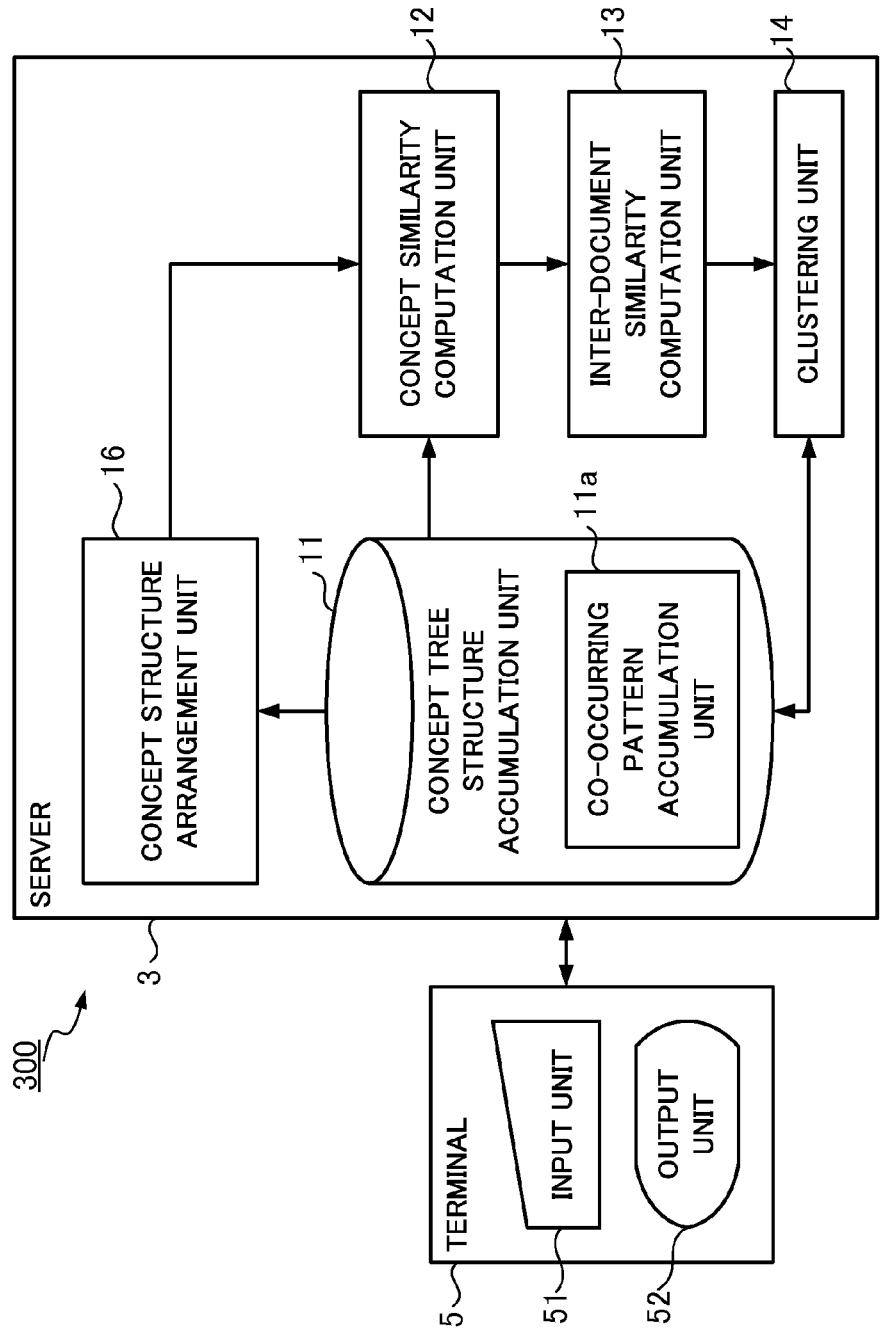
FIG. 8 is a block diagram illustrating an example of the construction of a document clustering system of a third embodiment of the present invention.

In the explanation below, the same reference numbers will be given to component elements that are the same as those in the embodiments above, and explanations of those elements will be omitted. As illustrated in FIG. 8, the server 3 of the document clustering system 300 of this third embodiment comprises, in addition to the construction of the first embodiment, a concept structure arrangement unit 16, and the concept tree structure accumulation unit 11 comprises a co-occurring pattern accumulation unit 11a. The document clustering system 300 accumulates co-occurring patterns for each word in the concept tree structure, and performs document clustering by arranging the words that are determined to have a low degree of co-occurrence, or in other words, by arranging words that were determined to not have a high connection with the concept. The co-occurring pattern accumulation unit 11a is the same as that explained for the second embodiment.

The concept structure arrangement unit 16 references to the co-occurring patterns that are stored by the co-occurring pattern accumulation unit 11a, and deletes or masks words in the concept tree structure that is stored by the concept tree structure accumulation unit 11 that were determined to have a low degree of co-occurrence. By omitting words that were determined to have a low degree of co-occurrence, or that were determined to have low similarity, precision when finding the concept similarity becomes high and the document clustering system 300 is able to perform document clustering having more similar concepts.

Figure 9:
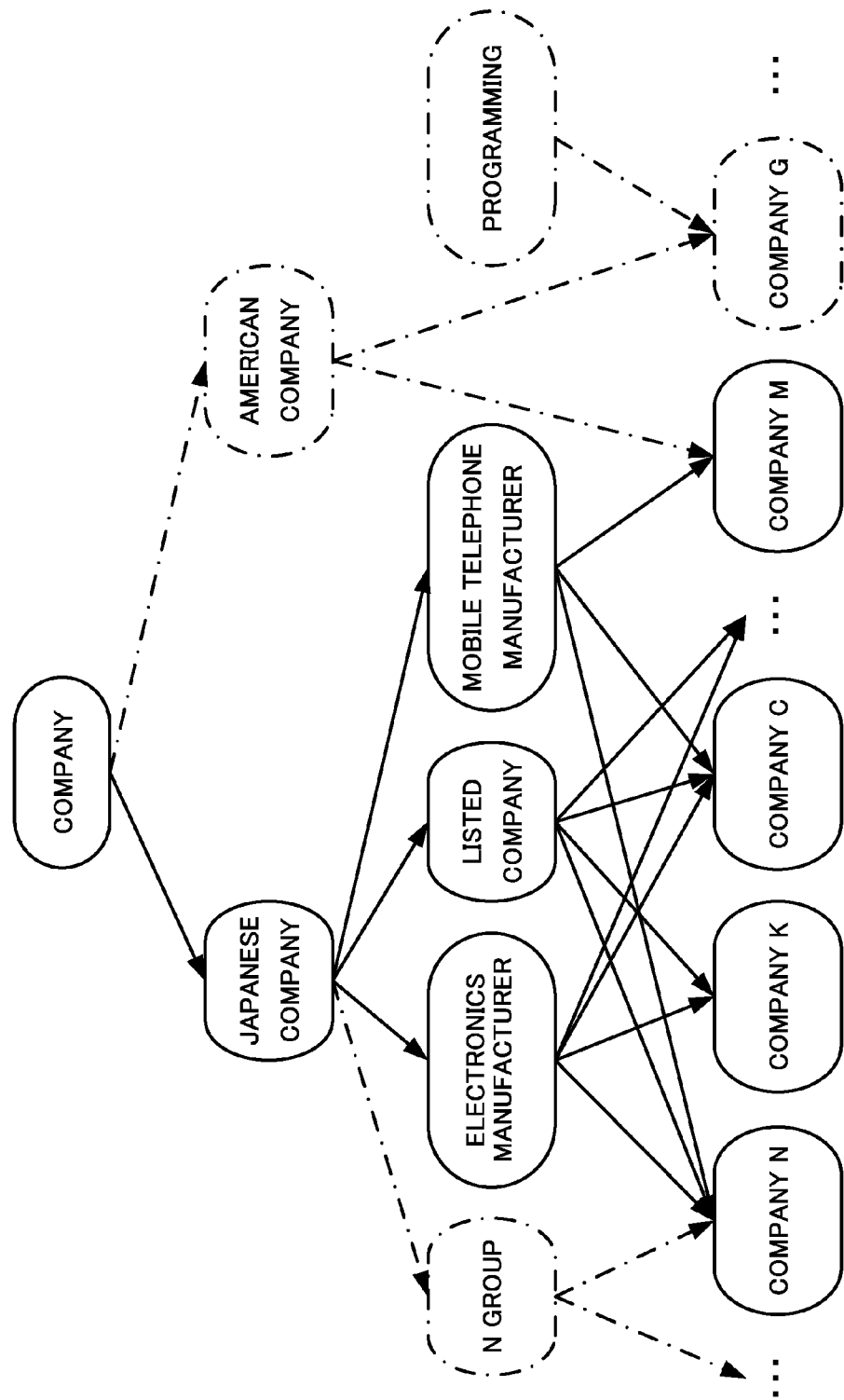
FIG. 9 is a drawing illustrating an example of a concept tree structure.

The concept tree structure that is stored by the concept tree structure accumulation unit 11 of this third embodiment is as the concept tree structure illustrated in FIG. 9. The concept tree structure that is illustrated in FIG. 9 has the same data as that illustrated in FIG. 2, however, some of the words are surrounded by a dot-dash line, and the arrows that connect the words that are surrounded by the dot-dash lines with higher-order word and subordinate words are illustrated using dot-dash lines. The words that are surrounded by dot-dash lines have a low degree of co-occurrence, so they are words that do not particularly need to be taken into consideration when finding the concept similarity. By omitting these words, it is possible to increase the precision when the document clustering system 300 finds concept similarity.

Next, the operation of arranging the words that were determined not to have a high connection with the concept is explained. The concept structure arrangement unit 16 references to the inputted document set, the concept tree structure that is stored by the concept tree structure accumulation unit 11 and the co-occurring patterns stored by the co-occurring pattern accumulation unit 11a, and deletes words having a degree of co-occurrence that is lower than a specified value.

More specifically, the concept structure arrangement unit 16 first finds the document frequency DF(W) for each word of the concept tree structure. The document frequency DF(W) is the same as in the first embodiment, and is the number of documents in which subordinated category words of the word W appear. Next, the concept structure arrangement unit 16 finds the document frequency DF(W) for other subordinate category words of that higher-order word. When doing this, when the document frequency DF(W) is less than a preset set value, the concept structure arrangement unit 16 deletes that word. The concept structure arrangement unit 16 deletes words that have no similarity with the concept by finding the document frequency DF(W) from the subordinate category words toward the higher-order words of the concept tree structure that is stored by the concept tree structure accumulation unit 11.

Figure 10:
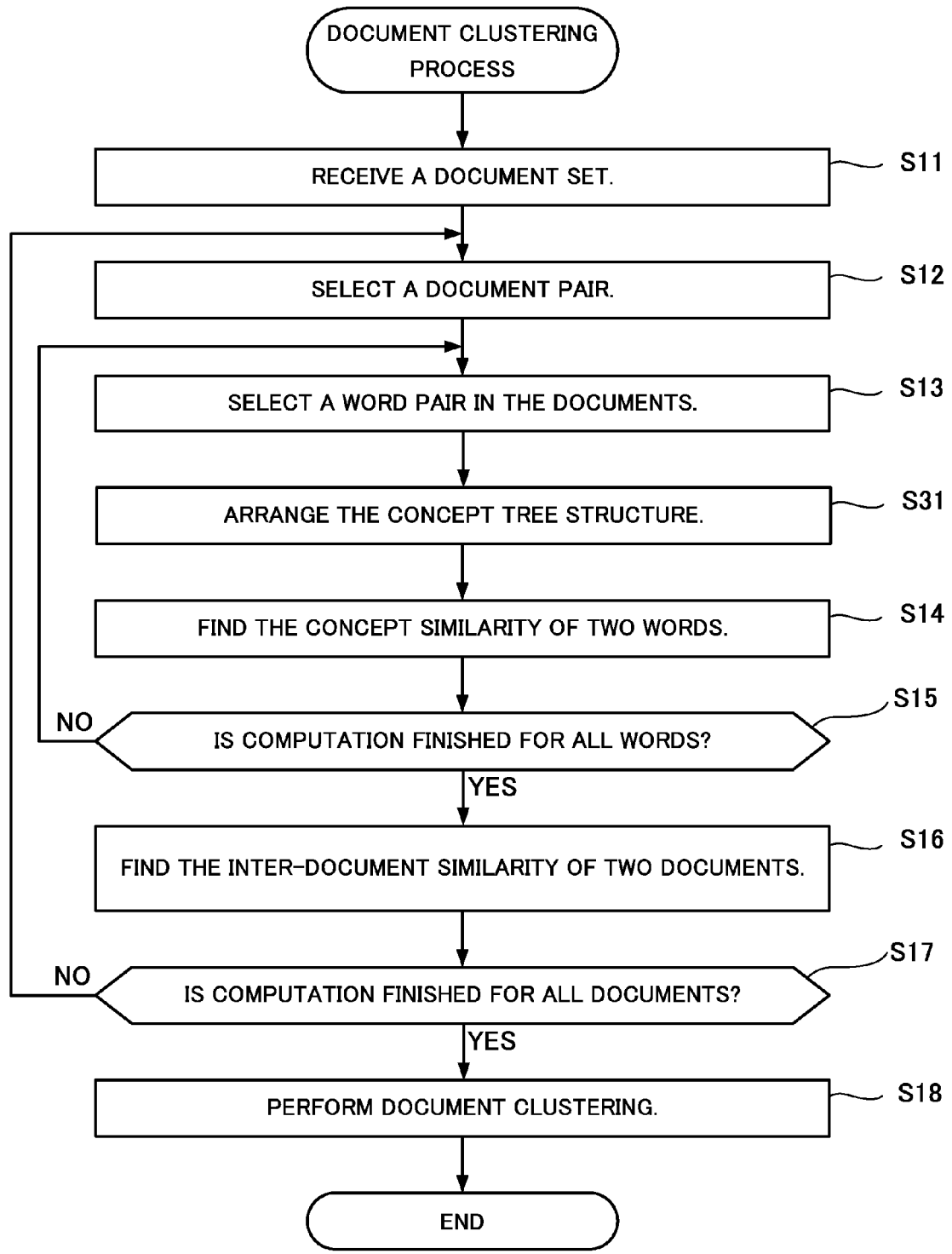
FIG. 10 is a flowchart illustrating an example of the operation of the document clustering process of a third embodiment.

The document clustering system 300 explained above operates as illustrated in FIG. 10. The concept tree structure accumulation unit 11 stores a concept tree structure beforehand, and the co-occurring pattern accumulation unit 11a stores the co-occurring patterns for each word in that concept. Basically, the flow of the operation of the document clustering process is the same as that in the first embodiment.

The input unit 51 of the terminal 5 inputs a document set to the server 3 of the document clustering system 300, and the document clustering system 300 receives that document set (step S11). The concept similarity computation unit 12 selects a document pair by extracting two documents from the document set (step S12). The concept similarity computation unit 12 also selects word pairs by extracting words from each document (step S13).

Next, the concept structure arrangement unit 16 references to the co-occurring patterns that are stored by the co-occurring pattern accumulation unit 11a, and arranges the concept tree structure based on the degree of co-occurrence (step S31). When doing this, the concept structure arrangement unit 16 can perform processing at the same time as the process (FIG. 7, step S21) for setting the superconcept by the superconcept setting unit 15 in the second embodiment.

Then, the concept similarity computation unit 12 finds the concept similarity for two words based on the concept tree structure that was arranged in step S31 (step S14). When concept similarity was not found for any word pairs (step S15: NO), processing returns to step S13.

After the concept similarity has been found for all word pairs (step S15: YES), the inter-document similarity computation unit 13 finds the inter-document similarity for two documents (step S16) based on the concept similarity that was found. When inter-document similarity could not be found for any document pairs (step S17: NO), processing returns to step S12.

After the inter-document similarity has been found for all document pairs (step S17: YES), the clustering unit 14 performs document clustering based on the inter-document similarities that were found (step S18), and the operation of the document clustering process ends.

As explained above, with the third embodiment, the document clustering system 300, by using the concept tree structure and the frequency of appearance of words in the inputted documents, and by taking into consideration the semantic similarity between words, can sort the inputted document set.

Moreover, the document clustering system 300 stores a co-occurring pattern for each word in the concept tree structure, and can arrange the words that were determined to have low co-occurrence, or in other words, words that were determined not to have a high connection with the concept, so it is possible to perform clustering of document that are more similar in the concept.

Embodiment 4

Figure 11:
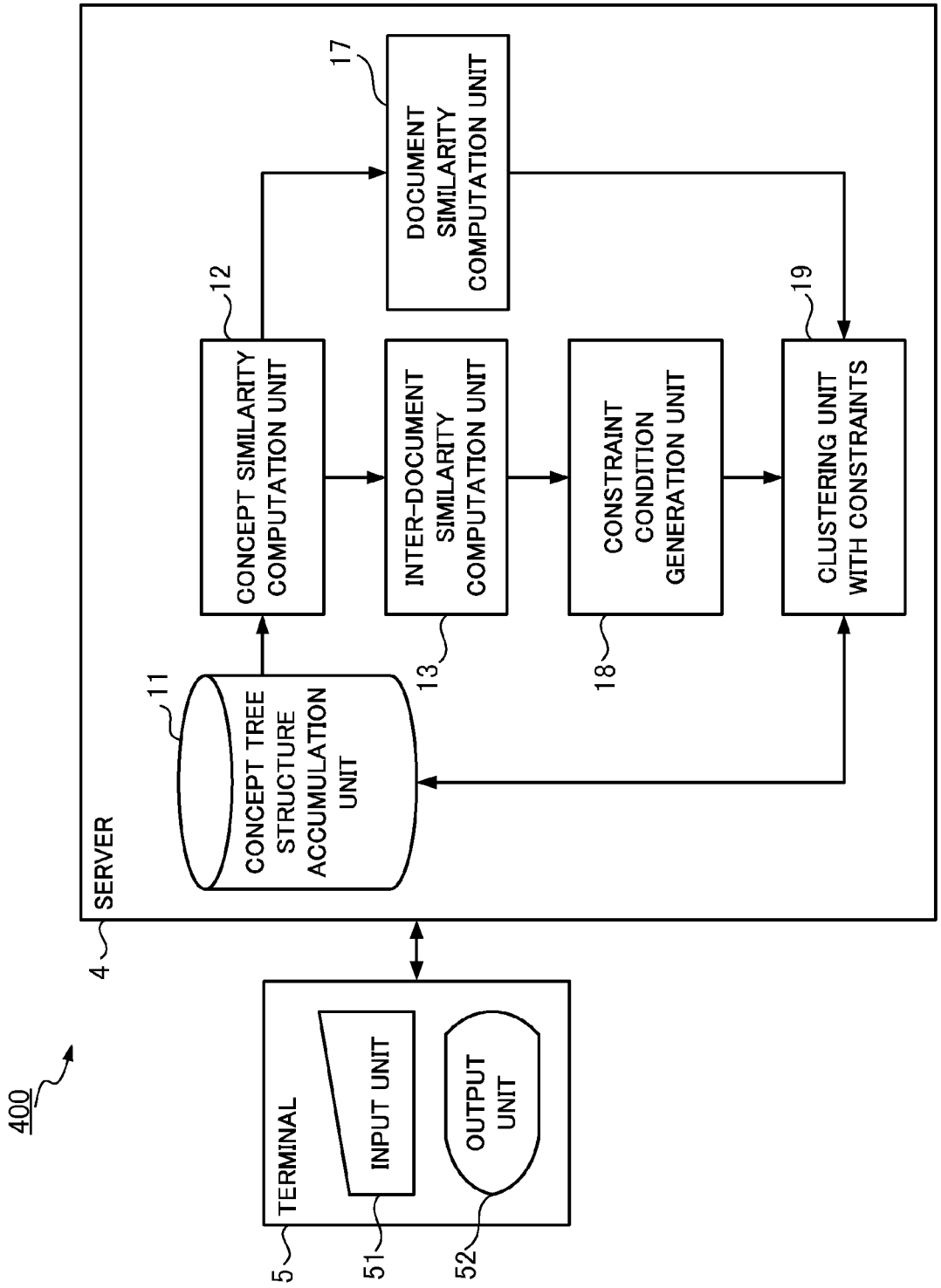
FIG. 11 is a block diagram illustrating an example of the construction of a document clustering system of a fourth embodiment of the present invention.

In the explanation below, the same reference numbers are given to component elements that are the same as those in the embodiments described above, and explanations are omitted. As illustrated in FIG. 11, the server 4 of the document clustering system 400 of the fourth embodiment, instead of the clustering unit 14 in the construction of the first embodiment, comprises a clustering unit 19 with constraints, and furthermore, comprises a document similarity computation unit 17 and constraint condition generation unit 18. When performing document clustering, the document clustering system 400 attaches conditions for performing clustering.

The document similarity computation unit 17 finds the document similarity, which is the degree of similarity between two documents, based on the frequency of appearance of words that are included in two documents of a document set. The document similarity is the inter-document similarity that is used in typical document clustering. However, in the present invention, in order to distinguish between this similarity and the inter-document similarity that used the average sum of the concept similarity of all word pairs and that was found by the inter-document similarity computation unit 13, this similarity will be called the document similarity. The document similarity computation unit 17, for example, finds the document similarity by a typical method such as morphological analysis.

The constraint condition generation unit 18 generates and stores constraint conditions based on the inter-document similarity that was found by the inter-document similarity computation unit 13. The constraint conditions are used when performing clustering after giving constraints to the document pair that is the target of clustering. The clustering method used for this is called clustering with constraint. More specifically, the constraint condition is a condition that indicates whether two documents are to be put in the same cluster or to be put in different clusters.

The constraint condition above, for example, is represented by a condition such as illustrated in FIG. 12. The values $\theta 1, \theta 2$ ($\theta 1 > \theta 2$) are set specified threshold values. The condition "must" is a condition in which the document pair having inter-document similarity must belong to the same cluster. The condition "cannot" is a condition in which the document pair having inter-document similarity cannot belong to the same cluster. There are cases in which only one of the constraints "must" or "cannot" is set.

The clustering unit 19 with constraints performs document clustering based on the document similarity that was found by the document similarity computation unit 17. However, the clustering unit 19 with constraints admits a document into or excludes a document from a cluster so that the constraint condition that was generated by the constraint condition generation unit 18 is satisfied. In other words, document pairs having inter-document similarity with the "must" condition are admitted into the same cluster. However, document pairs having inter-document similarity with the "cannot" condition are placed in clusters different from each other. Alternatively, at least one document is excluded from the cluster that the other document belongs to.

Next, the operation of clustering with constraints process will be explained. The constraint condition generation unit 18, based on the inter-document similarity that was found by the inter-document similarity computation unit 13, generates constraint conditions that indicate whether two documents should be placed in the same cluster, or should be placed in different clusters.

For example, when the value "a" of the inter-document similarity is a>θ1, then referencing to FIG. 12, the constraint condition becomes "must", and the document pair must belong to the same cluster. When the value "a" of the inter-document similarity is a<θ2, the constraint condition becomes "cannot", and the document pair must belong to different clusters (or one document must be excluded from a cluster). When only one condition, "must" or "cannot" is set, the document pair, depending on the condition, is admitted to the cluster, or is separated into a different cluster or excluded from the cluster.

The example described above is one example, and the constraint conditions "must" and/or "cannot" can be set arbitrarily, as well as the threshold value can be set arbitrarily.

Figure 13:
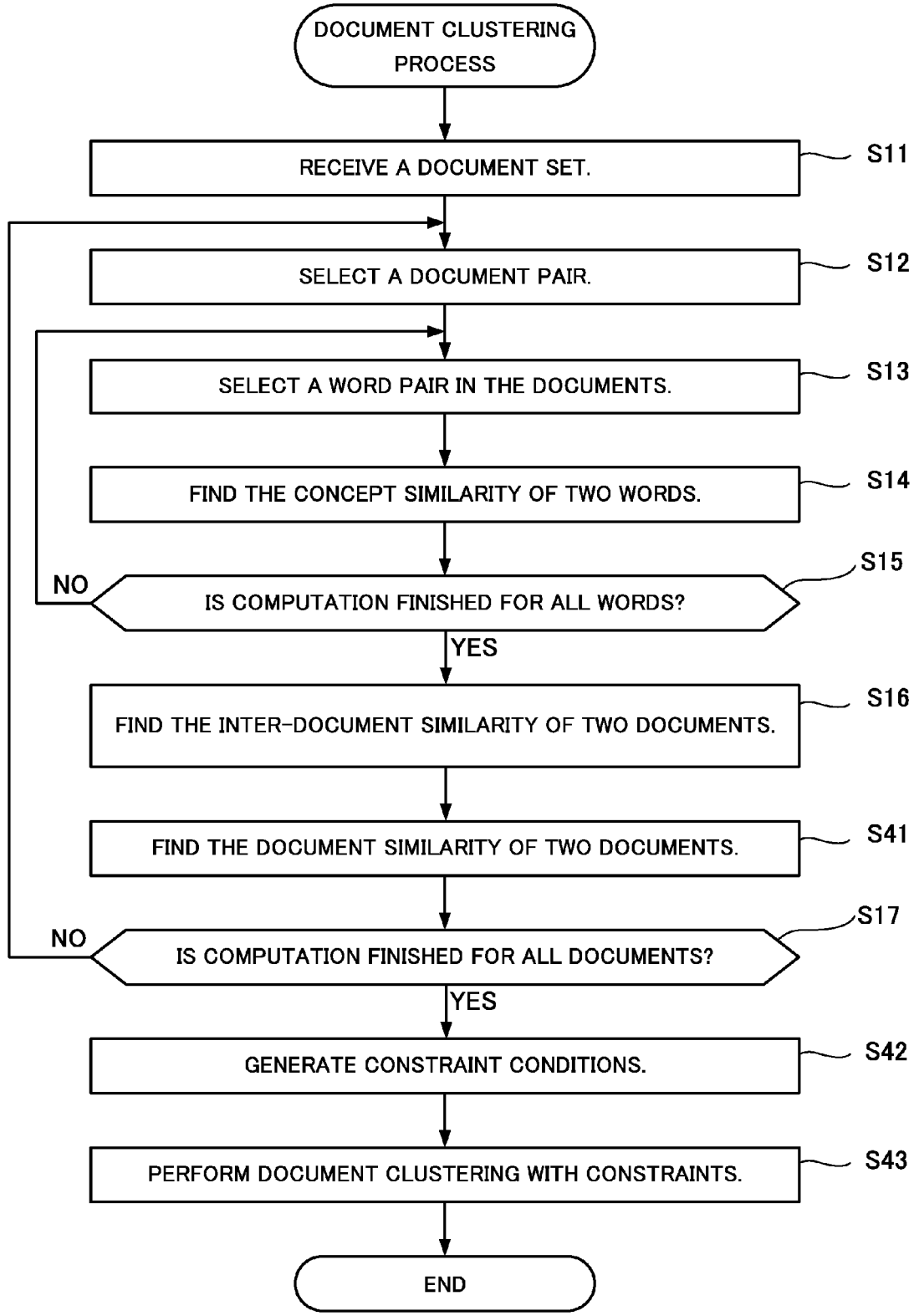
FIG. 13 is a flowchart of an example of the operation of the document clustering process of a fourth embodiment.

The document clustering system 400 explained above operates as illustrated in FIG. 13. The concept tree structure accumulation unit 11 stores a concept tree structure beforehand, and a program necessary for generating constraint conditions and judgment criteria for "must" and "cannot", which will be threshold values, are set in the constraint condition generation unit 18. Basically, the flow of the operation of the document clustering process is the same as in the first embodiment.

The input unit 51 of the terminal 5 inputs a document set to the server 4 of the document clustering system 400, and the document clustering system 400 receives that document set (step S11). The concept similarity computation unit 12 selects a document pair by extracting two documents from the document set (step S12). The concept similarity computation unit 12 also selects a word pair by extracting words from each document (step S13), and finds the concept similarity for the two words (step S14).

When no concept similarity could be found for any of the word pairs (step S15: NO), process returns to step S13.

After the concept similarities have been found for all word pairs (step S15: YES), the inter-document similarity computation unit 13 finds the inter-document similarity for two documents based on the concept similarity that was found (step S16).

Next, the document similarity computation unit 17 finds the document similarity, which is the degree of similarity of two documents, based on the frequency of appearance of words included in the two documents (step S41).

When no inter-document similarity or document similarity could be found for any of the document pairs (step S17: NO), processing returns to step S12.

After the inter-document similarity and document similarity has been found for all document pairs (step S17: YES), the constraint condition generation unit 18 generates constraint conditions based on the inter-document similarity (step S42).

Then, the clustering unit 19 with constraints performs clustering with constraints of documents based on the document similarity found in step S41 and the constraint conditions that were generated in step S42 (step S43), after which the operation of the document clustering process ends.

As explained above, with this fourth embodiment, the document clustering system 400, by taking into consideration the semantic similarity between words, based on the concept tree structure and the frequency of the appearance of words in inputted documents, is able to sort an inputted document set. In other words, the document clustering system 400, by adding conditons when performing document clustering, is able to perform document clustering according to the concept of the documents.

In conceptual terms, in a space of document similarity, there is a possibility that a document pair that is far in a space of inter-document similarity (inter-document similarity is small) exists in a document set constructing one cluster (document set having a relationship with large document similarity). In such a case, with the fourth embodiment, a cluster that is generated based on the document similarity is divided into two or more clusters (or a document is excluded from a cluster). Moreover, there is a possibility that a document isolated near the boundary of clusters that are generated based on document similarity may be admitted to one of the clusters separated. With the document clustering system 400 of this fourth embodiment, more adequate document clustering can be performed in accordance with the document concept.

Furthermore, when generating constraint conditions, the document clustering system 400 is able to automatically generate constraint conditions based on the inter-document similarity, so the generation of constraint conditions does not require much time or work, and thus it becomes possible to easily perform document clustering.

The document clustering systems 100, 200, 300 and 400 of the first through fourth embodiments are examples, and the invention is not limited to these, for example, it is possible to configure a system by combining the superconcept setting unit 15 and the concept structure arrangement unit 16, or by combining the superconcept setting unit 15, the document similarity computation unit 17, the constraint condition generation unit 18 and the clustering unit 19 with constraints. Moreover, for the document clustering systems 100, 200, 300 and 400 of the first through fourth embodiments, examples were given of providing the concept tree structure accumulation unit 11 with a co-occurring pattern accumulation unit 11a, however, the concept tree structure and co-occurring patterns can be stored in a database style in a memory unit (as will be described later), and can be arbitrarily set.

Furthermore, in the document clustering systems 100, 200, 300 and 400 the concept structure that expresses the concept are not limited to a concept tree structure, and can be arbitrarily set. In addition, the method for finding the concept similarity, the method for finding the inter-document similarity, the method for finding the document similarity and the method for setting and generating constraint conditions are not limited to the examples described above, and can be set arbitrarily.

Next, an example of the hardware construction of the document clustering systems 100, 200, 300 and 400 will be explained. As illustrated in FIG. 14, the servers 1, 2, 3 and 4 and the terminal 5 of the document clustering systems 100, 200, 300 and 400 comprise a control unit 31, main memory unit 32, external memory unit 33, operation unit 34, display unit 35, input/output unit 36 and transmitting/receiving unit 37. The main memory unit 32, external memory unit 33, operation unit 34, display unit 35, input/output unit 36 and transmitting/receiving unit 37 are each connected to the control unit 31 via an internal bus 30.

The control unit 31 comprises a central processing unit (CPU) and the like, and according to a control program 40 that is stored in the external memory unit 33, executes each of the processing of concept tree structure accumulation unit 11, co-occurring pattern accumulation unit 11a, concept similarity computation unit 12, inter-document similarity computation unit 13, clustering unit 14, superconcept setting unit 15, concept structure arrangement unit 16, document similarity computation unit 17, constraint condition generation unit 18 and clustering unit 19 with constraints.

The main memory unit 32 comprises random access memory (RAM) in which the control program 40 that is stored in the external memory unit 33 is loaded, and is further used as a work area of the control unit 31.

The external memory unit 33 comprises a non-volatile memory such as a flash memory, a hard disk, a DVD-RAM (Digital Versatile Disc Random-Access Memory), a DVD-RW (Digital Versatile Disc ReWritable), and stores a program beforehand for causing the control unit 31 to execute each of the process described above, supplies data that the program stores according to an instruction from the control unit 31, and stores data that is supplied from the control unit 31.

The concept tree structure accumulation unit 11 and co-occurring pattern accumulation unit 11a described above are comprised of the external memory unit 33. The concept tree structure accumulation unit 11 and co-occurring pattern accumulation unit 11a may also be comprised of the external memory unit 33.

The operation unit 34 comprises a keyboard, a pointing device such as a mouse and the like, and an interface that connects the keyboard, the pointing device and the like to the internal bus 30. The operation unit 34 has the function of processing user instructions and the like, and supplies data that is inputted by user operation and the like to the control unit 31.

The display unit 35 comprises an LCD (Liquid Crystal Display) or an organic EL (Electro Luminescence), and displays operation history information and the like.

The input/output unit 36 comprises a serial interface or parallel interface. In the case where the input/output unit 36 is a device to which a terminal 5 is attached, the input/output unit 36 connects to the terminal 5.

The transmitting/receiving unit 37 comprises a network terminating device or wireless communication device that are connected to a network N, and a serial interface or LAN (Local Area Network) interface that are connected to the transmitting/receiving unit 37. The transmitting/receiving unit 37, via the network N, receives a document set that is the target of clustering, and transmits the clustering results. When the terminal 5 is separated from the server, the server 1, 2, 3 or 4, for example connects to the terminal 5 via the network N by way of the transmitting/receiving unit 37.

The processing by the concept tree structure accumulation unit 11, co-occurring pattern accumulation unit 11a, concept similarity computation unit 12, inter-document similarity computation unit 13, clustering unit 14, superconcept setting unit 15, concept structure arrangement unit 16, document similarity computation unit 17, constraint condition generation unit 18, clustering unit 19 with constraints and the like is executed by the control program 40 using the control unit 31, main memory unit 32, external memory unit 33, operation unit 34, display unit 35, input/output unit 36, transmitting/receiving unit 37 and the like as resources.

In other words, the control program 40 uses the control unit 31, main memory unit 32, external memory unit 33, operation unit 34, display unit 35, input/output unit 36 and transmitting/receiving unit 37 as resources, and executes: a concept tree structure acquisition step of acquiring a concept tree structure that expresses the hierarchical relationship of a concept of a plurality of words; a document set acquisition step of acquiring a document set, which is a collection of documents; a concept similarity computation step of finding the concept similarity, which is an index indicating how close two words are in a concept; an inter-document similarity computation step of finding, based on the concept similarity that was found in the concept similarity computation step, the inter-document similarity, which is the degree of semantic similarity between two documents that are included in the document set that was acquired in the document set acquisition set; and a clustering step of performing document clustering of the document set based on the inter-document similarity that was found in the inter-document similarity computation step.

In addition, the hardware construction and flowcharts above are an example, and can be arbitrarily changed or modified.

The portion that centers around performing document clustering that comprises the concept tree structure accumulation unit 11, co-occurring pattern accumulation unit 11a, concept similarity computation unit 12, inter-document similarity computation unit 13, clustering unit 14, superconcept setting unit 15, concept structure arrangement unit 16, document similarity computation unit 17, constraint condition generation unit 18 and clustering unit 19 with constraints does not require a special system and can be achieved by using a normal computer system. For example, a computer program for executing the operations above can be stored on a recording medium (flexible disk, CD-ROM, DVD-ROM, and the like) that can be read by a computer, and distributed, and the server 1, 2, 3, 4 and terminal 5 that execute the processing above can be constructed by installing that computer program onto a computer. Moreover, by storing that computer program in a memory device of a server device on a communication network such as the Internet, the server 1, 2, 3, 4 and terminal 5 can be constructed by downloading that computer program by a normal computer system.

Furthermore, when the server 1, 2, 3, 4 and terminal 5 are achieved by the OS (operating system) and application program sharing tasks, or by the OS and application program working together, only part of the application program needs to be stored on a recording medium or in a memory device.

The computer program can also be superimposed on a carrier wave and distributed by way of a communication network. For example, the computer program can be submitted to a bulletin board system (BBS) of a communication network and that computer program can be distributed over the network. Then, by activating that computer program and executing the program under the control of the OS as any other application program, it is possible to execute the processing above.

Moreover, the present invention can be embodied in various ways and can be modified within the broad scope and range of the invention. The embodiments described above are for explaining the present invention and do not limit the range of the invention. That is, the range of the present invention is not that of the embodiments, but rather is that disclosed in the claims. Various modifications that are within the scope of the claims and within the range of an equivalent invention are also regarded as being within the scope of the present invention.

Part or all of the embodiments above are disclosed below but not limited to the additional notes below.

(Note 1)

A document clustering system comprises:
  a concept tree structure acquisition unit that acquires a concept tree structure that represents the hierarchical relationship of a concept of a plurality of words;
  a document set acquisition unit that acquires a document set, which is a collection of documents;
  a concept similarity computation unit that finds the concept similarity between two arbitrary words of the document set that was acquired by the document set acquisition unit, the concept similarity being an index indicating the closeness of the two words in a concept;
  an inter-document similarity computation unit that finds inter-document similarity, which is the degree of semantic similarity between two documents that are included in the document set that was acquired by the document set acquisition unit, based on the concept similarity found by the concept similarity computation unit; and
  a clustering unit that performs document clustering of the document set based on the inter-document similarity that was found by the inter-document similarity computation unit.

(Note 2)

In the document clustering system according to note 1, the concept similarity computation unit finds the concept similarity for two arbitrary words of the document set that was acquired by the document set acquisition unit such that the concept similarity is a maximum when the frequency of appearance in the document set of higher-order words or words of a subordinate category of the higher-order words that are common to the two words in the concept tree structure that was acquired by the concept tree structure acquisition unit coincides with the frequency of appearance in the document set of each of the two words, and is a minimum when there are no common higher-order words of the two words in the concept tree structure.

(Note 3)

In the document clustering system according to note 1 or note 2, the concept similarity computation unit finds the concept similarity based on the ratio of the frequency of appearance in the document set of higher-order words or words of a subordinate category of the higher-order words that are common to the two words in the concept tree structure with respect to the frequency of appearance in the document set of each of the two words, or based on the amount of information.

(Note 4)

In the document clustering system according to note 3, the concept similarity computation unit finds the frequency of appearance of words in the document set by finding the ratio of the number of documents in which the words appear in the documents with respect to the number of documents in which the words appear, or the number of documents included in the document set, and by finding the ratio of the number of words appearing with respect to the frequency of the words, which is the number of times that the words appear in the document set, or with respect to the number of documents included in the document set.

(Note 5)

In the document clustering system according to any one of the notes 1 to 4, the inter-document similarity computation unit divides the two documents into one or two or more words, and takes the value of the sum of the concept similarities of arbitrary combinations of words that appear in one document and that appear in the other document, to which weighting of the number of words appearing in the documents is added to each concept similarity, or takes the value of the sum of the concept similarities that have been normalized by the number of words appearing in the documents as the inter-document similarity.

(Note 6)

The document clustering system according to any one of the notes 1 to 5, further comprises:
  a co-occurring pattern acquisition unit that acquires co-occurring patterns that include words that co-occur with the words in the concept tree structure that was acquired by the concept tree structure acquisition unit; and
  a superconcept setting unit that selects context conforming higher-order words, which are higher-order words of the higher-order words that are common with the two words, and of which the number of the words in a specified range in each document that includes each of the two words that coincide with the words of the co-occurring pattern acquired by the co-occurring pattern acquisition unit for the common higher-order words is a maximum; and wherein the concept similarity computation unit finds the concept similarity based on the context conforming higher-order words that were selected by the superconcept setting unit from among the higher-order words that are common with the two words.

(Note 7)

In the document clustering system according to note 6, the superconcept setting unit references to the document set and selects words around the two words, references to the co-occurring pattern and compares that with the co-occurring pattern of the higher-order words of the surrounding words, and selects context conforming higher-order words by finding the average of the degree of coinciding co-occurrence.

(Note 8)

The document clustering system according to any one of the notes 1 to 7, further comprises:
  a concept tree structure arrangement unit that, based on the frequency of appearance of words of the concept tree structure that was acquired by the concept tree structure acquisition unit in the document set that was acquired by the document set acquisition unit, eliminates part of the concept tree structure, which is the hierarchical relationship in which the contribution to the total value of the concept similarity computed by the concept similarity computation unit is a specified value or less, from the concept tree structure that was acquired by the concept tree structure acquisition unit, wherein
  the concept similarity computation unit eliminates the part of the concept tree structure that was eliminated by the concept tree structure arrangement unit, and finds the concept similarity.

(Note 9)

In the document clustering system according to note 8, the concept tree structure arrangement unit, based on the frequency of appearance of words of the concept tree in the document set, eliminates the hierarchical relationship of higher-order words that have lower-order words directly below that higher-order word that do not appear often compared to the words that appear in the document set.

(Note 10)

The document clustering system according to any one of the notes 1 to 9, further comprises:

a document similarity computation unit that, based on the frequency of appearance of words included in two documents of the document set that was acquired by the document set acquisition unit, finds the document similarity, which is the degree of similarity between the two documents; wherein the clustering unit, based on the inter-document similarity that was found by the inter-document similarity computation unit, generates at least one constraint condition of a constraint for placing the two documents, which have the inter-document similarity that is equal to or greater than a specified threshold value, in the same cluster, and a constraint for not placing the two documents, which have the inter-document similarity that is less than a specified threshold value, in the same cluster, and while performing document clustering in the document set based on the document similarity that was found by the document similarity computation unit, generates a cluster that satisfies the constraint conditions.

(Note 11)

In the document clustering system according to any one of the notes 1 to 10, the clustering unit, based on the similarity between two documents, performs clustering by a coagulation method or K-MEANS method.

(Note 12)

In the document clustering system according to note 11 in the clustering unit, the similarity set the inter-document similarity as a measure of similarity between two documents (inverse of the distance).

(Note 13)

In the document clustering system according to any one of the notes 1 to 12, the concept tree structure is a DAG structure.

(Note 14)

In the document clustering system according to any one of the notes 1 to 13, the concept similarity computation unit corrects the document frequency and word frequency based on the additional smoothing method.

(Note 15)

In the document clustering system according to note 7, the superconcept setting unit finds the surrounding words based on limits according to distance from the position of appearance of the words, characteristic words of a document, or independent words in a dependency relationship by syntax analysis.

(Note 16)

In the document clustering system according to note 7, the superconcept setting unit finds higher-order words of the surrounding words based on the amount of mutual information according to the frequency of appearance of co-occurring words.

(Note 17)

In the document clustering system according to any one of the notes 1 to 16, the document set acquisition unit acquires the document set via a network from an external terminal device that is connected via a network.

(Note 18)

A document clustering method that is performed by a clustering system for sorting a collection of a plurality of documents into document clusters and that comprises:

a concept tree structure acquisition step that acquires a concept tree structure that represents the hierarchical relationship of a concept of a plurality of words;

a document set acquisition step that acquires a document set, which is a collection of documents;

a concept similarity computation step that finds the concept similarity between two arbitrary words of the document set that was acquired by the document set acquisition unit, the concept similarity being an index indicating the closeness of the two words in a concept;

an inter-document similarity computation step that finds inter-document similarity, which is the degree of semantic similarity between two documents that are included in the document set that was acquired by the document set acquisition step, based on the concept similarity found by the concept similarity computation step; and a clustering step that performs document clustering of the document set based on the inter-document similarity that was found by the inter-document similarity computation step.

(Note 19)

A recording medium that can be read by a computer stores a program that causes a computer to execute:

a concept tree structure acquisition step that acquires a concept tree structure that represents the hierarchical relationship of a concept of a plurality of words;

a document set acquisition step that acquires a document set, which is a collection of documents;

a concept similarity computation step that finds the concept similarity between two arbitrary words of the document set that was acquired by the document set acquisition unit, the concept similarity being an index indicating the closeness of the two words in a concept;

an inter-document similarity computation step that finds inter-document similarity, which is the degree of semantic similarity between two documents that are included in the document set that was acquired by the document set acquisition step, based on the concept similarity found by the concept similarity computation step; and a clustering step that performs document clustering of the document set based on the inter-document similarity that was found by the inter-document similarity computation step.

This application is based on Japanese Patent Application No. 2009-290956 filed on Dec. 22, 2009. The disclosure of the above Japanese Patent Application is incorporated herein by reference in its entirety. The specification, claims, and drawings of Japanese Patent Application No. 2009-290956 are incorporated into this application by reference.

INDUSTRIAL APPLICABILITY

The present invention can also be applied to uses such as a thesis sorting and arrangement system, or sorted display of search results in a document search system.

DESCRIPTION OF REFERENCE NUMERALS 1, 2, 3, 4 Server
5 Terminal
11 Concept tree structure accumulation unit
11a Co-occurring pattern accumulation unit
12 Concept similarity computation unit
13 Inter-document similarity computation unit
14 Clustering unit
15 Superconcept setting unit
16 Concept structure arrangement unit
17 Document similarity computation unit
18 Constraint condition generation unit
19 Clustering unit with constraints 51 Input unit
52 Output unit
31 Control unit
32 Main memory unit
33 External memory unit
34 Operation unit
35 Display unit
36 Input/output unit
37 Transmitting/receiving unity
40 Control program
100, 200, 300, 400 Document clustering system

What is claimed is:

1. A document clustering system comprising:
a control device comprising a computer device that executes each of:
a concept tree structure acquisition unit that acquires a concept tree structure that represents the hierarchical relationship of a concept of a plurality of words;
a document set acquisition unit that acquires a document set, which is a collection of documents;
a concept similarity computation unit that finds the concept similarity between two arbitrary words of the document set that was acquired by the document set acquisition unit, the concept similarity being an index indicating the closeness of the two words in a concept;
an inter-document similarity computation unit that finds inter-document similarity, which is the degree of semantic similarity between two documents that are included in the document set that was acquired by the document set acquisition unit, based on the concept similarity found by the concept similarity computation unit;
a clustering unit that performs document clustering of the document set based on the inter-document similarity that was found by the inter-document similarity computation unit;
a co-occurring pattern acquisition unit that acquires co-occurring patterns that include words and co-occurrence that co-occur with the words in the concept tree structure that was acquired by the concept tree structure acquisition unit; and
a superconcept setting unit that selects context conforming higher-order words, which are higher-order words of the higher-order words that are common with the two words, and of which the number of the words in a specified range in each document that includes each of the two words that coincide with the words of the co-occurring pattern acquired by the co-occurring pattern acquisition unit for the common higher-order words is a maximum,
wherein the concept similarity computation unit finds the concept similarity based on the context conforming higher-order words that were selected by the superconcept setting unit from among the higher-order words that are common with the two words.

2. A document clustering system comprising:
a control device comprising a computer device that executes each of:
a concept tree structure acquisition unit that acquires a concept tree structure that represents the hierarchical relationship of a concept of a plurality of words;
a document set acquisition unit that acquires a document set, which is a collection of documents;
a concept similarity computation unit that finds the concept similarity between two arbitrary words of the document set that was acquired by the document set acquisition unit, the concept similarity being an index indicating the closeness of the two words in a concept;
an inter-document similarity computation unit that finds inter-document similarity, which is the degree of semantic similarity between two documents that are included in the document set that was acquired by the document set acquisition unit, based on the concept similarity found by the concept similarity computation unit; and
a clustering unit that performs document clustering of the document set based on the inter-document similarity that was found by the inter-document similarity computation unit,
wherein the concept similarity computation unit finds the concept similarity for two arbitrary words of the document set that was acquired by the document set acquisition unit such that the concept similarity is a maximum when the frequency of appearance in the document set of higher-order words or words of a subordinate category of the higher-order words that are common to the two words in the concept tree structure that was acquired by the concept tree structure acquisition unit coincides with the frequency of appearance in the document set of each of the two words, and is a minimum when there are no common higher-order words of the two words in the concept tree structure.

3. The document clustering system according to claim 2, wherein the concept similarity computation unit finds the concept similarity based on the ratio of the frequency of appearance in the document set of higher-order words or words of a subordinate category of the higher-order words that are common to the two words in the concept tree structure with respect to the frequency of appearance in the document set of each of the two words, or based on the amount of information.

4. The document clustering system according to claim 3, wherein the concept similarity computation unit finds the frequency of appearance of words in the document set by finding the ratio of the number of documents in which the words appear with respect to the number of documents in which the words appear, or the number of documents included in the document set, and by finding the ratio of the number of words appearing with respect to the frequency of the words, which is the number of times that the words appear in the document set, or with respect to the number of documents included in the document set.

5. The document clustering system according to claim 2, wherein the inter-document similarity computation unit divides the two documents into one or two or more words, and takes the value of the sum of the concept similarities of arbitrary combinations of words that appear in one document and that appear in the other document, to which weighting of the number of words appearing in each of the documents is added to each concept similarity, or takes the value of the sum of the concept similarities that have been normalized by the number of words appearing in the documents as the inter-document similarity.

6. The document clustering system according to claim 1, wherein the superconcept setting unit references to the document set and selects words around the two words, references to the co-occurring pattern and compares that with the co-occurring pattern of the higher-order words of the surrounding words, and selects the context conforming higher-order words by finding the average of the degree of coinciding co-occurrence.

7. The document clustering system according to claim 2, further comprising:
a concept tree structure arrangement unit that, based on the frequency of appearance of words of the concept tree structure that was acquired by the concept tree structure acquisition unit in the document set that was acquired by the document set acquisition unit, eliminates that part of the concept tree structure, which is the hierarchical relationship in which the contribution to the total value of the concept similarity computed by the concept similarity computation unit is a specified value or less, from the concept tree structure that was acquired by the concept tree structure acquisition unit, wherein the concept similarity computation unit eliminates the part of the concept tree structure that was eliminated by the concept tree structure arrangement unit, and finds the concept similarity.

8. The document clustering system according to claim 7, wherein the concept tree structure arrangement unit, based on the frequency of appearance of words of the concept tree structure in the document set, eliminates the hierarchical relationship of higher-order words that have lower-order words directly below that higher-order word that do not appear often compared to the words that appear in the document set.

9. The document clustering system according to claim 2, further comprising:

a document similarity computation unit that, based on the frequency of appearance of words included in two documents of the document set that was acquired by the document set acquisition unit, finds the document similarity, which is the degree of similarity between the two documents, wherein the clustering unit, based on the inter-document similarity that was found by the inter-document similarity computation unit, generates at least one constraint condition of a constraint for placing the two documents, which have the inter-document similarity that is equal to or greater than a specified threshold value, in the same cluster, and a constraint for not placing the two documents, which have the inter-document similarity that is less than a specified threshold value, in the same cluster, and while performing document clustering in the document set based on the document similarity that was found by the document similarity computation unit, generates a cluster that satisfies the constraint conditions.

10. The document clustering system according to claim 2, wherein the clustering unit, based on the similarity between two documents, performs clustering by a coagulation method or K-MEANS method.

11. The document clustering system according to claim 10, wherein the similarity is a measure of the inter-document similarity (inverse of the distance) between two documents.

12. The document clustering system according to claim 2, wherein the concept tree structure is a DAG structure.

13. The document clustering system according to claim 2, wherein the concept similarity computation unit corrects the document frequency and word frequency based on the additional smoothing method.

14. The document clustering system according to claim 6, wherein the superconcept setting unit finds the surrounding words based on limits according to distance from the position of appearance of the words, characteristic words of a document, or independent words in a dependency relationship by syntax analysis.

15. The document clustering system according to claim 6, wherein the superconcept setting unit finds higher-order words of the surrounding words based on the amount of mutual information based on the frequency of appearance of co-occurring words.

16. The document clustering system according to claim 2, wherein the document set acquisition unit acquires the document set via a network from an external terminal device that is connected via a network.

17. A document clustering method that is performed by a clustering system for sorting a collection of a plurality of documents into document clusters, the clustering system including a control device comprising a computer device that executes each of:

a concept tree structure acquisition step that acquires a concept tree structure that represents the hierarchical relationship of a concept of a plurality of words;

a document set acquisition step that acquires a document set, which is a collection of documents;

a concept similarity computation step that finds the concept similarity between two arbitrary words of the document set that was acquired by the document set acquisition step, the concept similarity being an index indicating the closeness of the two words in a concept;

an inter-document similarity computation step that finds inter-document similarity, which is the degree of semantic similarity between two documents that are included in the document set that was acquired by the document set acquisition step, based on the concept similarity found by the concept similarity computation step;

a clustering step that performs document clustering of the document set based on the inter-document similarity that was found by the inter-document similarity computation step;

a co-occurring pattern acquisition step that acquires co-occurring patterns that include words and co-occurrence that co-occur with the words in the concept tree structure that was acquired by the concept tree structure acquisition step; and a superconcept setting step that selects context conforming higher-order words, which are higher-order words of the higher-order words that are common with the two words, and of which the number of the words in a specified range in each document that includes each of the two words that coincide with the words of the co-occurring pattern acquired by the co-occurring pattern acquisition step for the common higher-order words is a maximum, wherein the concept similarity computation step finds the concept similarity based on the context conforming higher-order words that were selected by the superconcept setting step from among the higher-order words that are common with the two words.

18. A document clustering method that is performed by a clustering system for sorting a collection of a plurality of documents into document clusters, the clustering system including a control device comprising a computer device that executes each of:

a concept tree structure acquisition step that acquires a concept tree structure that represents the hierarchical relationship of a concept of a plurality of words;

a document set acquisition step that acquires a document set, which is a collection of documents;

a concept similarity computation step that finds the concept similarity between two arbitrary words of the document set that was acquired by the document set acquisition step, the concept similarity being an index indicating the closeness of the two words in a concept;

an inter-document similarity computation step that finds inter-document similarity, which is the degree of semantic similarity between two documents that are included in the document set that was acquired by the document set acquisition step, based on the concept similarity found by the concept similarity computation step;

a clustering step that performs document clustering of the document set based on the inter-document similarity that was found by the inter-document similarity computation step, wherein the concept similarity computation step finds the concept similarity for two arbitrary words of the document set that was acquired by the document set acquisition step such that the concept similarity is a maximum when the frequency of appearance in the document set of higher-order words or words of a subordinate category of the higher-order words that are common to the two words in the concept tree structure that was acquired by the concept tree structure acquisition step coincides with the frequency of appearance in the document set of each of the two words, and is a minimum when there are no common higher-order words of the two words in the concept tree structure.

19. A non-transitory computer recording medium that can be read by a computer and stores a program that causes the computer to execute:

a concept tree structure acquisition step that acquires a concept tree structure that represents the hierarchical relationship of a concept of a plurality of words;

a document set acquisition step that acquires a document set, which is a collection of documents;

a concept similarity computation step that finds the concept similarity between two arbitrary words of the document set that was acquired by the document set acquisition step, the concept similarity being an index indicating the closeness of the two words in a concept;

an inter-document similarity computation step that finds inter-document similarity, which is the degree of semantic similarity between two documents that are included in the document set that was acquired by the document set acquisition step, based on the concept similarity found by the concept similarity computation step;

a clustering step that performs document clustering of the document set based on the inter-document similarity that was found by the inter-document similarity computation step;

a co-occurring pattern acquisition step that acquires co-occurring patterns that include words and co-occurrence that co-occur with the words in the concept tree structure that was acquired by the concept tree structure acquisition step; and a superconcept setting step that selects context conforming higher-order words, which are higher-order words of the higher-order words that are common with the two words, and of which the number of the words in a specified range in each document that includes each of the two words that coincide with the words of the co-occurring pattern acquired by the co-occurring pattern acquisition step for the common higher-order words is a maximum, wherein the concept similarity computation step finds the concept similarity based on the context conforming higher-order words that were selected by the superconcept setting step from among the higher-order words that are common with the two words.

20. A non-transitory computer recording medium that can be read by a computer and stores a program that causes the computer to execute:

a concept tree structure acquisition step that acquires a concept tree structure that represents the hierarchical relationship of a concept of a plurality of words;

a document set acquisition step that acquires a document set, which is a collection of documents;

a concept similarity computation step that finds the concept similarity between two arbitrary words of the document set that was acquired by the document set acquisition step, the concept similarity being an index indicating the closeness of the two words in a concept;

an inter-document similarity computation step that finds inter-document similarity, which is the degree of semantic similarity between two documents that are included in the document set that was acquired by the document set acquisition step, based on the concept similarity found by the concept similarity computation step; and a clustering step that performs document clustering of the document set based on the inter-document similarity that was found by the inter-document similarity computation step, wherein the concept similarity computation step finds the concept similarity for two arbitrary words of the document set that was acquired by the document set acquisition step such that the concept similarity is a maximum when the frequency of appearance in the document set of higher-order words or words of a subordinate category of the higher-order words that are common to the two words in the concept tree structure that was acquired by the concept tree structure acquisition step coincides with the frequency of appearance in the document set of each of the two words, and is a minimum when there are no common higher-order words of the two words in the concept tree structure.

* * * * *